United States Patent [19]

Kuhlmann et al.

[11] Patent Number: 5,018,097
[45] Date of Patent: May 21, 1991

[54] MODULARLY STRUCTURED DIGITAL COMMUNICATIONS SYSTEM FOR INTERCONNECTING TERMINAL EQUIPMENT AND PUBLIC NETWORKS, AND HAVING OPERATION AND RELIABILITY PROGRAMS

[75] Inventors: Klaus Kuhlmann, Munich; Siegfried Elstner, Eichenau; Manfred Sonnemann, Alling, all of Fed. Rep. of Germany; Franz Schweiger, Vienna, Austria; Axel Verlohr, Munich, Fed. Rep. of Germany; John Muyssen, Evergem, Belgium; Roger Lybeer, B Destelbergen, Fed. Rep. of Germany

[73] Assignee: Siemens Akitiengesellschaft, Munich, Fed. Rep. of Germany

[21] Appl. No.: 233,750

[22] Filed: Aug. 19, 1988

[30] Foreign Application Priority Data

Aug. 21, 1987 [DE] Fed. Rep. of Germany ....... 3727942
Aug. 21, 1987 [DE] Fed. Rep. of Germany ....... 3727952
Aug. 21, 1987 [DE] Fed. Rep. of Germany ....... 3727954
Jun. 13, 1988 [DE] Fed. Rep. of Germany ....... 3820072

[51] Int. Cl.5 .................... G06F 3/00; G06F 15/46; G06F 15/20
[52] U.S. Cl. .................... 364/900; 364/919; 364/927.96; 364/929.2; 364/931.41; 364/931.43; 364/933.9; 364/940.62; 364/948.1; 364/974; 364/974.1; 364/974.2; 364/974.7; 364/976
[58] Field of Search .................. 364/200, 900; 370/60, 370/85.1, 94.1; 379/5, 29, 90; 380/25, 40

[56] References Cited

U.S. PATENT DOCUMENTS

| | | | |
|---|---|---|---|
| 4,200,930 | 4/1980 | Rawlings et al. | 364/200 |
| 4,400,778 | 8/1983 | Vivian et al. | 364/200 |
| 4,402,040 | 8/1983 | Evett | 364/200 |
| 4,466,063 | 8/1984 | Segarra et al. | 364/900 |
| 4,467,147 | 8/1984 | Rubin | 379/29 |
| 4,543,630 | 9/1985 | Neches | 364/200 |
| 4,570,217 | 2/1986 | Allen et al. | 364/200 |
| 4,621,321 | 11/1986 | Boebert et al. | 364/200 |
| 4,754,326 | 6/1988 | Kram et al. | 379/96 |
| 4,763,317 | 8/1988 | Lehman et al. | 370/60 |

Primary Examiner—Stuart N. Hecker
Assistant Examiner—George C. Pappas
Attorney, Agent, or Firm—Hills, Santen, Steadman & Simpson

[57] ABSTRACT

Modularly Structured Digital Communications System having Operations-Oriented and Security-Oriented Components. The switching-oriented, the operations-oriented and the security-oriented components are divided into three structure levels such that apparatus program modules for generating logical switching technology messages, operating technology messages or security technology messages are provided in a line technology task structure. An operations-oriented coordination program module and switching procedure program modules for the control of the operations-oriented and of the switching-oriented information and data flow are provided in an operating technology switching technology coordination task structure. At least one operations-oriented and one security-oriented application program module for sequencing operations-oriented or security-oriented jobs are provided in an application task structure.

29 Claims, 15 Drawing Sheets

FIG. 6

| SYSTEM HEADER | SRC-TASK |
| | SRC-SU-TASK |
| | DEST-TASK |
| | DEST-SU-TASK |
| | EVENT CODE |
| SPEC. HEADER | PORT NR. |
| | CALL REF. |
| | SERV IND |
| | PORT NR. |
| | CALL REF |
| | SERV IND |
| | SRC CRSP |
| DATA FIELD | |

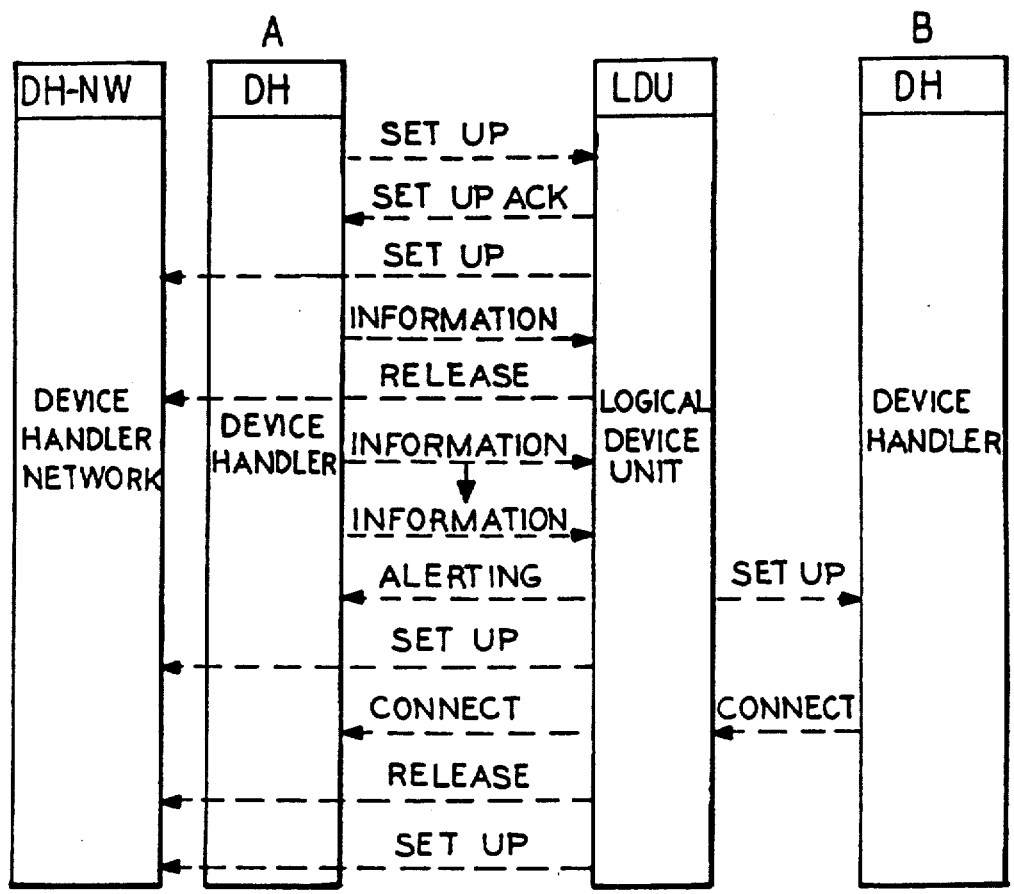
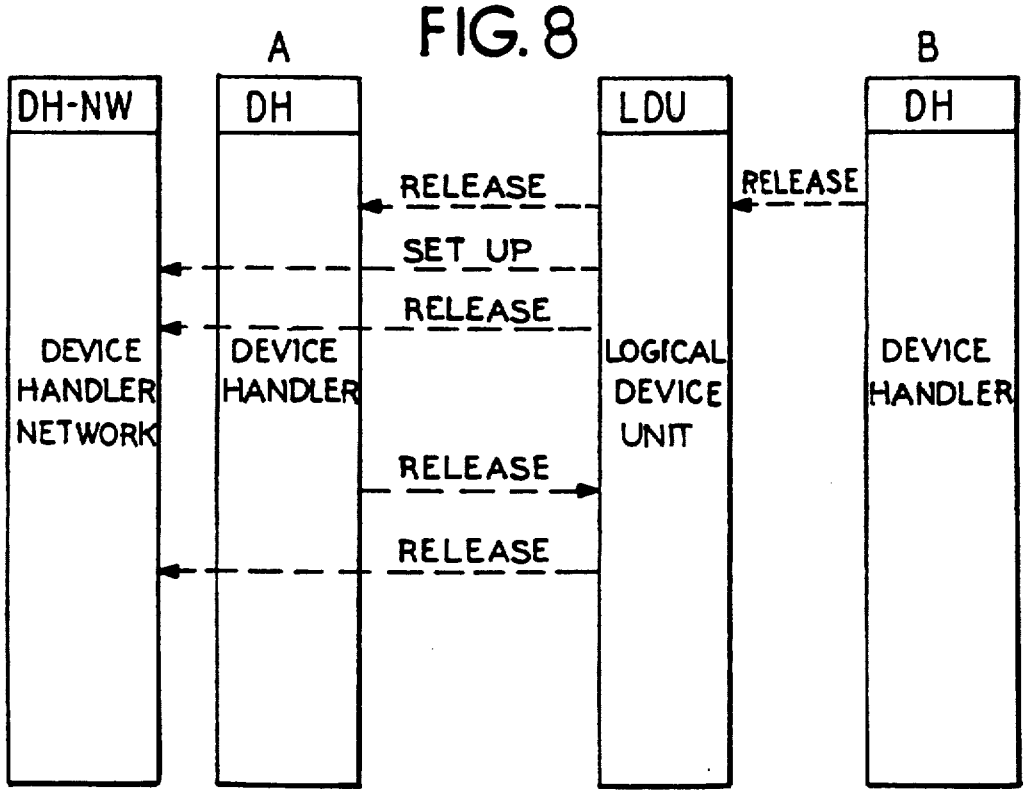

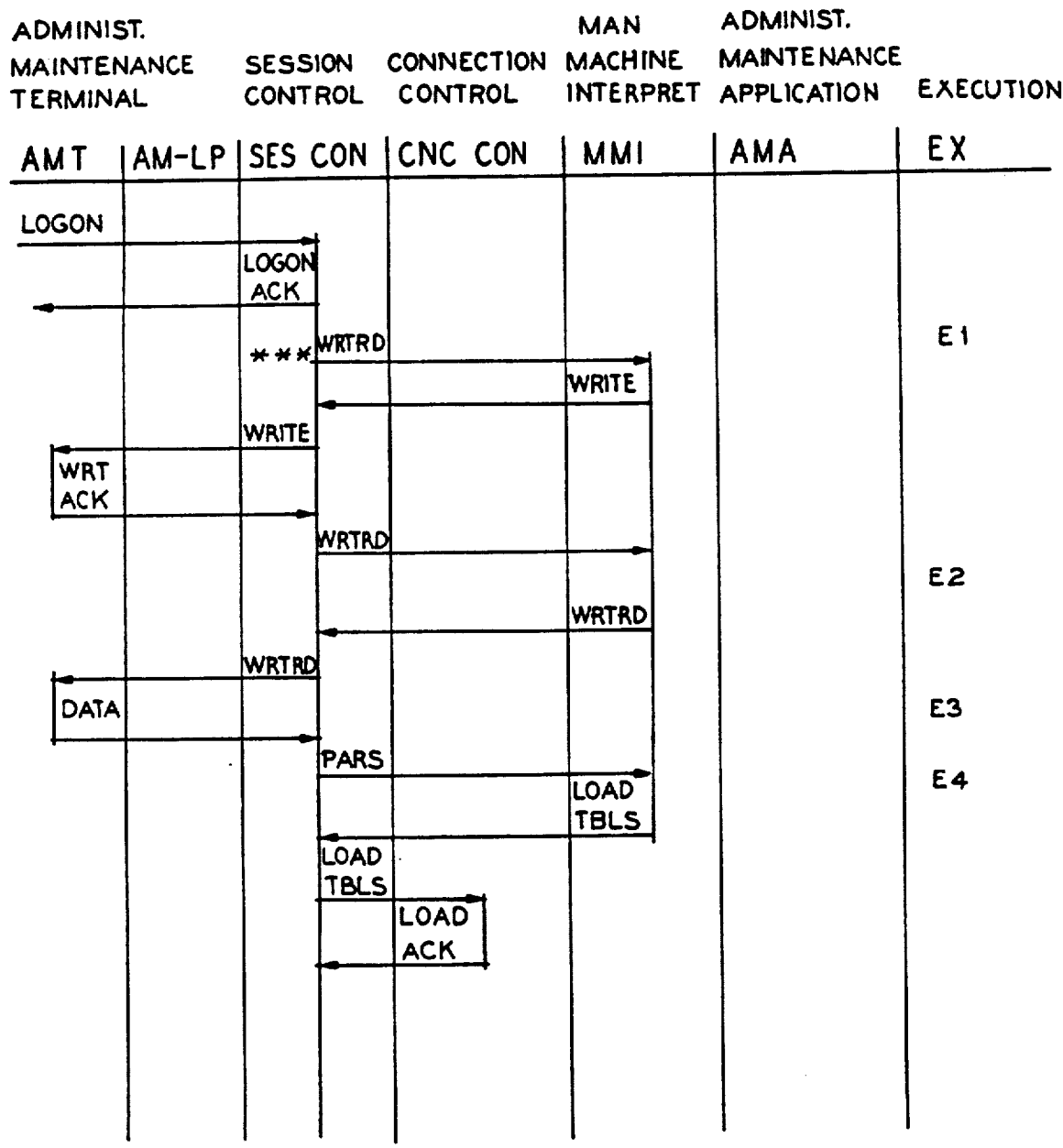

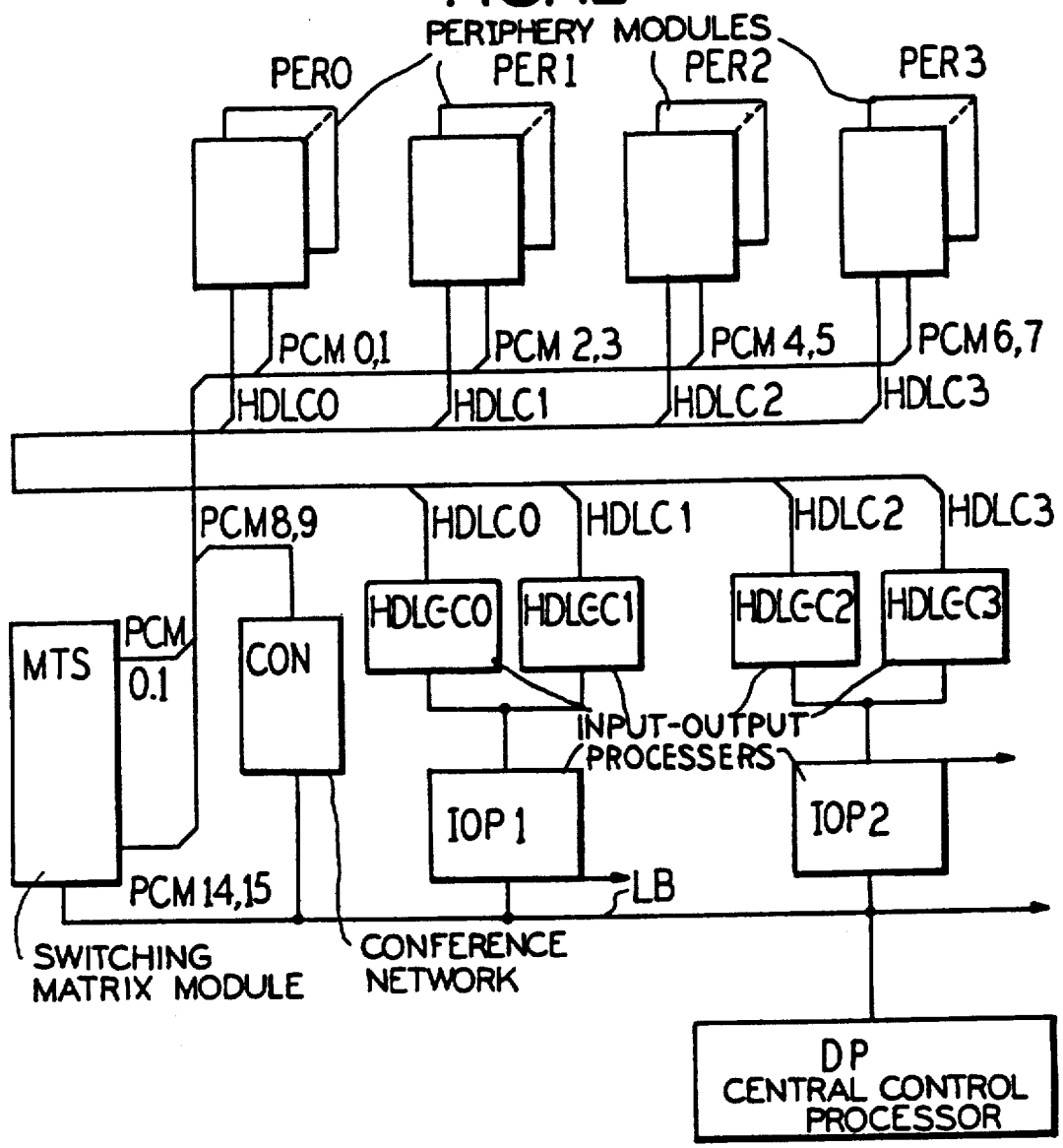

MODULARLY STRUCTURED DIGITAL COMMUNICATIONS SYSTEM FOR INTERCONNECTING TERMINAL EQUIPMENT AND PUBLIC NETWORKS, AND HAVING OPERATION AND RELIABILITY PROGRAMS

BACKGROUND OF THE INVENTION

Modularly structured digital communications systems serve the purpose of connecting terminal equipment usually having versatile performance features to one another and for connecting such terminal equipment to communication networks, particularly public networks. A special edition of "telcom report", ISDN im Buero, 1985, discloses such a communications system to which analog and digital telephones, telecopiers, multi-functional terminals, work station systems, personal computers, teletex, picture screen text stations and data terminal equipment can be connected and discloses networking with other communications systems. The essential component part of this communications system is a central communications computer having a system data base and having at least one multi-tasking operating system. A "task" is herein defined as an autonomous, independent execution unit that is composed of a runnable program as well as of its respective run environment, for example memory occupation or apparatus allocation. At every point in time, every task has the status of "active", "waiting" or "quiescent". Tasks can be executed in parallel to one another by a multi-tasking operating system, whereby this can be performed both by means of a plurality of processors working independently of one another as well as by means of a single processor in a time-division multiplex method. Further significant properties of tasks are that they can communicate with one another by status messages and can mutually synchronize one another.

The performance capability of such a digital communications system is critically determined by the software structure of the system. A known prior art communications system has a modularly structured software architecture whose significant component parts are, first, the multi-tasking operating system or the data base and, second, the actual communications software composed of the periphery software, the line technologY software and the switching-oriented connection software. The distribution of sub-functions of the control software to individual software modules or on to the entire software structure of the known communications system is adapted to a system size of several hundred up to several thousand terminals.

The performance and the usefulness of such a communications system essentially depend on the ability to organize and maintain the system that, in addition to other aspects, are subsumed under the term operating technology and depend on the error recognition, error display and error elimination that, in addition to other aspects, are subsumed under the term security technology.

The organizability of the system should be able to handle individual user requests with respect to the system expansion, the numbering plan, the multiplicity of apparatus and communications services in a fast simple reliable and user-friendly way. The most important functions of maintenance are, for example, manual switch requests for inhibiting enabling and switching system units, manual test requests, execution tracking and diagnosis acquisition as well a providing clear text output for the system operator. Prerequisite for the organizability and maintainability of the system is an all-embracing "administration" of the communications system. Belonging to this "administration" are data storage generating and re-generating, storing and caring for the customer data for system configuration, communications services and terminal equipment as well as traffic measurements.

The most important functions of the security technology are test routines of the system hardware components, identification of faults occurring in hardware components or in the control software level of the communications system by monitoring specific system-typical indicators within defined switching-oriented or operations-oriented statuses, and general function monitoring using test switching events and statistical error evaluations.

SUMMARY OF THE INVENTION

An object of the present invention is to provide a control and organization structure for the implementation of all switching-oriented, operations-oriented and security-oriented functions that represents an optimum compromise with respect to the different demands that these three functions make of the control and organization structure of a digital communications system.

This object is achieved by a modularly structured digital communications system for connecting terminal equipment to one another and, in particular, to public networks:

having at least one operating technology terminal equipment;

having at least one alarm-indicating terminal equipment indicating alarm messages acquired from system-security-oriented test events; and having a central system computer having a system data base and at least one multi-tasking operating system, for the administration of a line technology task structure having apparatus program modules associated with types of terminal equipment for generating logical status message and/or operating technology status messages from inputs at the terminal equipment and/or operating technology terminal equipment and for outputing setting data for the terminal equipment and/or operating technology terminal equipment or alarm indicating terminal equipment, said setting data, associated with types of apparatus, being acquired from logical status messages or operating technology status messages or alarm reports, for the administration of an operating technology and switching technology coordination task structure having an operations-oriented coordination program module for controlling the operations-oriented information and data flow, having switching procedure program modules that are structured independently of a class of terminal equipment and independently of a communications service in the sense of forming logical sub-processes of the overall switching process, being structured such that further performance feature program modules for the activation and de-activation of corresponding control procedures are formed in addition to at least one connection control program module for the control of the set-up and clear-down of connections, and having at least one security-oriented test and evaluation program module for the implementation of non-time-critical security-oriented test and evaluation events, and for the administration of an operations and security-oriented application task structure having application program modules for sequencing application-oriented functions, for example initialization maintenance, remote control technology, system status recovery;

whereby at least one part of the program modules is respectively individually accessible to the data base via defined data base access routines, and for connecting the line technology task structure to the operating technology and switching technology coordination task structure or for the connection thereof to the operations-oriented and security-oriented application task structure with a program bus structure having at least one transmission protocol defined with universal validity independently of the communication services and type of terminal equipment of the status messages communicated thereover formed and administered by the multi-tasking operating system.

In this modularly structured digital communications system, apparatus program modules are arranged in a line technology task. These apparatus program modules control the signalling methods and the user interface of the terminal equipment associated with a type of terminal equipment with respect to the switching technology. Signal output by the terminal equipment are converted by system-associated parameters into logical status messages for the communication computer and logical status messages of the communication computer are converted into setting data for the terminal equipment. Switching procedure program modules are provided in a switching technology task representing a second structure level, these switching procedure program modules being structured independently of the class of terminal equipment and independently of communications service in the sense of forming logical sub-processes of the overall switching process.

This organization and control structure of the switching technology of the communications system has the advantage that such a communications system in an arbitrary initial configuration can be expanded at any time later by additional types of terminal equipment and additional communications services without altering the basic structure of the modularly structured communications system. For the addition of new types of terminal equipment or communications services, a corresponding apparatus program module merely has to be inserted into the line technology task, whereas the remaining structural component parts, i.e. particularly the switching technology task, remain unaffected by this. This is essentially due to the fact that the dependencies of communications services and types of terminal equipment are inserted only into the domain of the line technology task or, respectively, into the data base thereof, so that the switching technology coordination task can be designed for a pure connection handler independently of the type of terminals to be interconnected and of the communications services these use.

A significant aspect of the digital communications system of the present invention is that operations-oriented and security-oriented functions are embedded in apparatus program modules of the line technology task structure and in program modules of an operations technology and switching technology coordination task structure as well as in at least one application program module of an operations-oriented and security-oriented application task structure.

The organization and control structure of the present invention is thus essentially based on the sequencing of all apparatus-associated function executions in the framework of operations-oriented jobs in operating technology apparatus program modules, in the framework of security-oriented jobs in security technology apparatus program modules, and in the framework of switching-oriented jobs in switching procedure program modules, i e in the creation of virtual interfaces independent of the type of apparatus as well as, first, in the control and realization of all functionally executions for the switching-oriented, operations-oriented and security-oriented information and data flow in program modules of the operating technology and switching technology coordination task structure and, second, in the sequencing of all application-oriented jobs in application program modules of the operations-oriented and security-oriented application task structure. These structural features are augmented by the application of standardized mechanisms between the individual task structure levels by using defined transmission protocols.

The structure of the communications system of the present invention provides a pronounced, strict modularity for the implementation of all switching-oriented, operations-oriented and security-oriented components in the sense that such a communications system can be customized without adaptations outside of the actual program modules. A later addition of new types of terminal equipment, of new performance features of such terminal equipment or the addition of new communications services with existing or new terminal equipment can be governed with respect both to the switching technologY as well as with respect to the operating technology and the security technology of the overall communications system bY adding new modules, particularly apparatus program modules and application program modules. Thus, in all aspects the communications system of the present invention offers a pronounced adaptability to an extensive or to a variable scope of performance without influencing the actual system structure or the system strategy underlying this system structure.

An advantageous improvement of the present invention is directed to an even farther-reaching structural combination of the switching-oriented, operations-oriented and security-oriented aspects and provides in this context that at least one part of the apparatus program modules, in addition to having a sub-module adapted to the respective main function, that is switching technology, operating technology, of the type of connected terminal equipment, also has a further, second, sub-module adapted to security-oriented functions. Insofar as such an apparatus program module is allocated to a switching-oriented terminal equipment, the corresponding apparatus program module can have a third sub-module adapted to operations-oriented functions.

The structure and functioning of the apparatus program modules is that the apparatus program modules have a pre-processing program level that evaluates signal output by the terminal equipment or operating technology terminal equipment according to individual line criteria and converts status messages from the operating technology and switching technology coordination task structure into setting data for the terminal equipment, operating technology terminal equipment or alarm indicating terminal equipment. It has an evaluation program level that converts the signals of all types of terminal equipment into protocol-suited status messages by means of system-associated parameters. An allocation program resident in the evaluation program level respectively branches status messages and information onto the sub-modules dependent on function.

In a similar way, the coordination program module and the switching procedure program module can also have a sub-module adapted to security-oriented aspects.

With respect to the status messages that are exchanged between the individual task structures, the transmission protocol, which is universally independent of the communications services and the type of terminal equipment, is used for the communication of exchange-oriented status messages, whereas, over and above this, a virtual terminal protocol similarly independent of the communications services and the type of terminal equipment is provided for operations-oriented status messages transmitted between the line technology task structure and the operating technology coordination task structure. A virtual application protocol, also independent of the communications services and the type of terminal equipment and providing a compact data arrangement that is at least approximately free of control characters, is provided for status messages transmitted within the application task structure and between the latter and the operating technology coordinating task structure. A text processor program module converts status messages in one of the two transmission protocols into status message in the other transmission protocol.

The virtual terminal protocol is preferably composed of a sequence of control information and data information, whereby the data information are composed of standard string elements, preferably in the ASCII format, and the control information contain logical control criteria for the input and output of such string elements (for example, positioning instructions, imaging attributes and field allocation criteria). The virtual terminal protocol thus serves as data interface of a virtual terminal, representing every terminal from and to the system. In order to be able to transmit the information in the virtual terminal protocol with optimum efficiency, only data modified in comparison to a status underlying a preceding status message are respectively transmitted in the status messages. For a transmission of such modified data, however, a discrimination must be made between the re-definition of an output structure (mask) and the introduction of "delta data" into this mask. In the definition of an output structure, the modified data modify the field division; otherwise they only modify the field content.

Just like the status messages in the virtual application protocol, the status messages in the virtual terminal protocol are preferably constructed such that a system data head part having a defined sequence of message originating and message destination addresses is followed by an operations-oriented-associated data head part having a protocol identification information differing for the two protocols, having a designation of a job session to which the respective status message belongs, and having a destination address indicating the application program module needed for running off the job session.

It is particularly the data between the text processor program module and the application program modules that are exchanged via the virtual application protocol. The data transmitted in this protocol are already checked for syntax and companded. The indicated parameters are entered in close proximity so that the entire protocol need not be forwarded in the transmission to another program module. The information transmitted in the virtual application protocol is less than the data forwarded in the virtual terminal protocol since all control characters are contained in the latter. Insofar as the text processor program module is inserted into an operating technology terminal equipment in which data tables for the individual applications can be stored, these being utilized in running off operations-oriented jobs with a system program of the operating technology terminal equipment that is structured like the coordination program module, there is the possibility for the terminal equipment to operate with a relatively small amount of information due the special properties of the virtual application protocol. As a result, the operating system and the transport control of the software bus structure as well as the storage capacity of the communications system are simplified.

The text processor program module can also be inserted into the operations-oriented application task structure for provision of a corresponding capability of the protocol converting in an operating technology terminal equipment. The text processor program module is thus considered to be an application program module in the broadest sense and provides for the conversion of instruction information, for example according to CCITT man-machine language, into application-suited data information. The text processor program module also supplies the logical control criteria required for user dialoging, whereby both "line" as well as mask-oriented methods are used for the user dialoging. Further sub-functions of the text processor program module, part of which have already been mentioned, are the syntax checking, the analysis of instructions according to parameter tree definitions (parsing), the execution of individual parameter checks compared to application-related data tables and the editing of output texts.

All operations-oriented accesses onto the communications system are controlled via the coordination program module, whereby the operations-oriented execution preferably occurs session-oriented in order to guarantee the exclusive use of the data-oriented connections for the user. The set-up, the chronological monitoring and the terminating of a session are accordingly controlled by the coordination program module. Interrelated thereto, the coordination program module administers internal memory resources for the respective session.

Further events controlled by the coordination program module are unsolicited data outputs without reservation on an output terminal equipment, coherent data outputs with absolute or conditioned reservation of an output terminal equipment and prioritized data outputs, with the possibility of interrupt of conditioned reservations in the presence of a prioritized data output.

For the presence of data, particularly application tables in peripheral data files, the coordination program module can be supplemented or supported by a data file administration program module for controlling the access to peripheral data files inserted into the operations-oriented coordination task structure. This data file administration program module is hierarchically lower-ranking than a data file administration task organization program. In such cases the fundamental organization and control structure of the communications system of the present invention is retained in that a memory program module for the control of search, read and write requests for the memories accepting the data files is inserted into the line technology task structure.

For the selection of the different application program modules, an application connection program module for the set-up and for the administration of the connection of the coordination program module to one of the application program modules can be inserted into the application task structure. The check for the presence of defined, addressed application program modules in the application task structure and, as warranted, the loading of such application tables from peripheral data files into the application task structure upon involvement of the data file administration program module and of the memory program module are then preferably inserted into the application connection program module.

The collaboration of the coordination program module and of the application connection program module preferably occurs such that the data input by an operations technology terminal equipment and edited by an appertaining operations technology apparatus program module are forwarded from the coordination program module to the text processor program module for checking which application program module is required for further processing. A status message dependent on the result of this check is than output to the application connection program module that sets up a connection of the coordination program module to the required application program module via which the coordination program module outputs the request data converted by the text processor program module to the application program module in the virtual application protocol. This application program module, after running the application-associated procedures in turn transfers the procedure result to the coordination program module in the virtual application protocol.

The application program modules introduced into the operations-oriented application task structure are system components for implementing the individual jobs for the initialization, maintenance and administration of the communications system as well as for the compilation of system status data for the data output and system care. Every application program module has a defined function scope, whereby the definition of the individual application program modules occurs such that a great variety of different, complex, operations-oriented jobs can be processed on the basis of successive call-in of the individual application program modules. Fundamentally, the application program modules can be divided into four different application categories:

1. Standard Applications

These are applications that relate to the data base of the communications system. For example, system-associated data such as authorizations or numbering plan, which can be established or modified with the assistance of such applications. The access to the data base is via the defined data base access routines.

2. System Applications

The basis for these applications are the operations-oriented, session-oriented data. With the assistance of these applications, for example, masks for defined output formats can be defined or a storing of active operations-oriented background procedures or a call-in or an interrupt thereof can occur.

3 Background Applications

Such background applications, for example, provide for the acceptance of data of an ongoing operations-oriented job in order, for example, to release an operations technology terminal equipment for further inputs even before the ongoing operations-oriented event is completely terminated.

4. Permanent Applications

Independent output activities, for example, alarm outputs at alarm fields, can be implemented with these applications without the cooperation of the coordination program module, these applications being preferably organized as an autonomous task.

A significant aspect of the security technology of the communications system is the initialization of the overall system. According to an advantageous development of the present invention, this sub-aspect is realized in that a system initialization program module is inserted into the operations-oriented and security-oriented application task structure, this system initialization program module being allocated to the multi-tasking operating system such that a run up task that coordinates the initialization of the program modules of all three task structure levels is initialized in the multi-tasking operating system by the system initialization program module. The system run up is thus higher-ranking than the operating system and its user tasks.

The run up task of the multi-tasking operating system coordinates the starting of the run up phase of further tasks, whereby the program modules of the task structures are preferably structured such that they control the initialization of the data and hardware system components respectively allocated to them. By contrast, the initialization of the system components that are not unambiguously allocated to one of the program modules of the task structures is carried out by the system initialization program module.

Data that are allocated to more than one task or to more than one program module are generally data of the data base. Initialization routines that can be called in by a data base task are made available for these data in addition to the data base access routines.

A further significant sub-aspect of the security technology of the communications system of the present invention is the system status recovery, generally referred to as "recovery", that also covers determinations of the nature and the scope of fault alarm displays. This "recovery" aspect is provided by a further development of the present invention wherein a system status recovery program module is controlled via a data table that can be configured by means of at least one operations-oriented application program module and in which information about the system status recovery measures to be initiated in the individual malfunctions, including the nature and the scope of fault alarm indications, are contained. For example, such statements relate to:
whether and how the fault signalling should ensue;
whether the fault is to be accepted into a corresponding fault storage;
whether the alarm indication contains a special priority; and
whether an additional, acoustic signalling should occur.

A distinction can be made between differently weighted "recovery" measures. Thus, for example, a fault can merely be displayed but the elimination of the fault can be left up to the user. However, it is also conceivable to place the affected program module or the affected hardware assembly in which the fault has occurred out of operation for specific faults. Further possibilities of eliminating a fault are what are referred to as "soft restart" wherein the system is re-initialized with existing two-party connections continuing to remain through-connected, and are what is referred to as "hard restart" wherein through-connect connections are also cleared down and all performance features are reset.

A commissioning program module inserted into the operations-oriented and security-oriented application task structure in accord with a further, advantageous development of the present invention provides for the commissioning and de-commissioning of lines and assemblies of the communications system. This program module can be called in from operations-oriented executions. Over and above this, the commissioning program module can also be called in as a "recovery" measure via line criteria, for inhibit and de-inhibit of assemblies or when reserving hardware system components for testing purposes.

In addition to the linkage of security-oriented functions with switching-oriented executions and operations-oriented executions, linkages between operations-oriented and switching-oriented functions can also occur. This aspect has a further development of the present invention wherein a traffic data acquisition program module for the acquisition of subscriber-related or communications service-related connection information is inserted into the operations-oriented and security-oriented application task structure. Connection information from at least one of the switching procedure program modules inserted into the coordination task structure are forwarded to the traffic data acquisition program module according to defined switching procedure sections in the form of status messages of the message protocol associated with the switching technology. The forwarding can occur such that the corresponding connection information are acquired in a sub-module of the switching procedure program module allocated to operations-oriented jobs and are forwarded via the software bus structure.

A further example of the linkage of operations-oriented and switching-oriented function executions is charge acquisition and interpretation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

FIG. 6 is a diagram of a fundamental structure of the status messages transmitted between the tasks;

FIG. 7 is a diagram of a task-overlapping status messages during call set up;

FIG. 8 is a diagram of a task-overlapping status messages during call clear down;

FIGS. 11a, 11b, 11c, 11d, 11e depict a graphic overview of the status message flow between the individual program modules of the digital communications system during the run of operations-oriented jobs;

FIG. 12 is a diagram of a hardware architecture of a communications system suitable for the organization and task structure of FIG. 1 having peripheral modules for a total of 64 subscriber or line terminals;

DESCRIPTION OF THE PREFERRED EMBODIMENT

Figure 1:
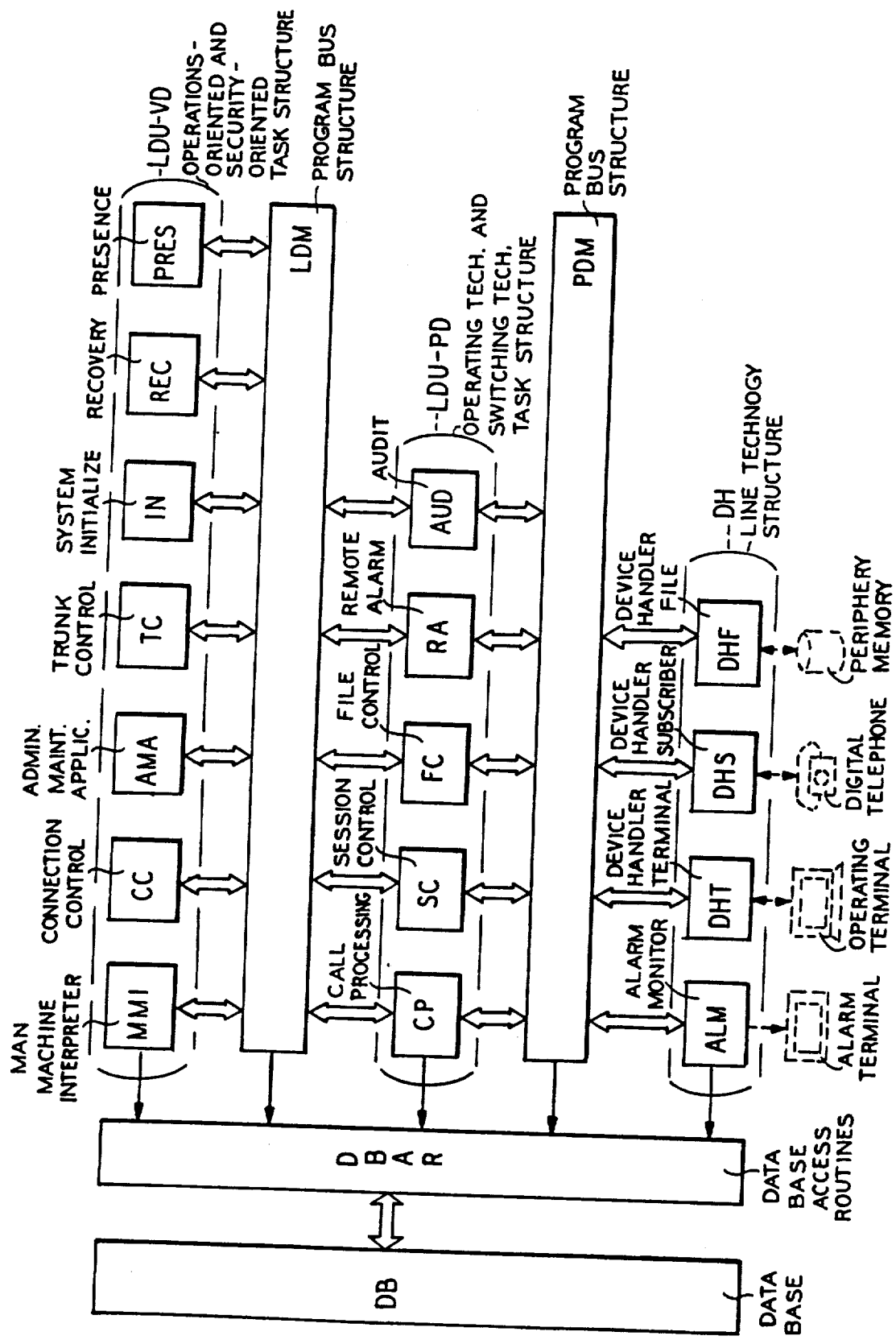
FIG. 1 is a diagram of the organization and control structure for the switching-oriented, operations-oriented and security-oriented information and data flow of a digital communications system.

The organization and control structure for the switching-oriented, operations-oriented and security-oriented data and information flow within a modularly structured communications system shown in FIG. 1 has three control levels each having a task structure DH, LDU PD, LDU VD between which status messages are interchanged via a program bus structure PDM, LDM. Four apparatus program modules ALM, DHT, DHS, DHF associated with the type of terminal equipment are located in the periphery-proximate line technology task structure DH, the first (DHT) having an operations-oriented terminal, the second (DHS) having a digital telephone terminal equipment, the third (DHF) having a periphery memory and the fourth (ALM) having an alarm monitor allocated to it. The exchange of status messages between the apparatus program modules ALM, DHT, DHS, DHF and the following operations technology and switching technologY coordination task structure LDU PD occurs in a defined transmission protocol, a virtual terminal protocol, with respect to the operations-oriented messages and occurs in a specific switching-oriented protocol with respect to the switching-oriented messages via a program bus PDM of the program bus structure PDM, LDM. The operations-oriented coordination task structure, represented by a coordination program module SC and a data file administration program module FC, is hierarchically equivalent to the switching-oriented coordination task structure - represented by a switching technology program module CP, and to a security-oriented coordination task structure, represented by an alarm report program module RA and a check and interpret program module AUD.

The functionally most important component part of the operations-oriented coordination task structure is the coordination program module SC via which the data and information flow essentially proceeds and is controlled. The data file administration program module FC controls the access of program modules of the operations-oriented application task structure LDU VD to peripheral data files.

The check and interpret program module AUD of the security-oriented coordination task structure represents a generally greater plurality of such program modules that control all non-time-critical functions of the security technology. Given the presence of a plurality of such check and interpret program modules AUD, these are preferably combined in common in one task. The alarm report program module RA reports malfunctions to terminals or sub-systems that are not directly connected to the communications system via lines.

In addition to sub-modules related only to switching-oriented jobs, the switching procedure program module CP representing the switching-oriented coordination task structure contains at least one operations-oriented sub-module and one security-oriented sub-module via which appropriate operations-oriented and security-oriented status messages are output to other program modules allocated to the operations technology or to the security technology.

Within the operations-oriented and security-oriented application task structure LDU VD, the operations-oriented application task structure is represented by an application program module AMA, an application connection program module CC, a text processor program module MMI and a traffic data acquisition program module TC.

The application program module AMA represents a generally greater plurality of application program modules for sequencing operations-oriented jobs in conjunction with the maintenance and the administration of the digital communications system. The traffic data acquisition program module TC can also be considered as an application program module in the broader sense; this program module TC provides for the acquisition of connection information related to subscribers or communications services, whereby the required connection information are forwarded via the program bus LDM of the program bus structure PDM, LDM from the switching procedure program module C? in the form of status messages of a status message protocol associated with the switching technology.

The application connection program module CC provides for the set-up and for the administration of the connection of the coordination program module SC to one of the application program modules AMA. Over and above this, the application connection program module CC also participates in the re-loading of data from peripheral storages via the data file administration program module FC.

The text processor program module MMI that supplies control criteria needed for user dialoging has the conversion of status messages in the virtual terminal protocol into status messages of a virtual application protocol and vice versa as its significant function. Whereas the virtual terminal protocol is used for status messages between the line technology task structure DH and the operating technology and switching technology coordination task structure LDU PD as well as for status messages from the coordination program module SC to the text processor program module MMI, all status messages, with the exception of status messages converted from the virtual application protocol into the virtual terminal protocol, from the text processor program module MMI to the coordination program module SC are transmitted in the virtual application protocol that is distinguished over the virtual terminal protocol by a compressed data sequence and, thus, a shorter length.

The security-oriented part of the operations-oriented and security-oriented application task structure LDU VD is represented by a system initialization program module IN, a system status recovery program module REC and a commissioning program module PRES.

The initialization of a run up task that coordinates the initialization of the program modules of all three task structure levels occurs in the multi-tasking operating system of the communications system by the system initialization program module IN. Whereas a self-initialization of all program modules is started by means of the run up task, the initialization of the system components that are not unambiguously allocated to one of the program modules of the different task structures occurs with the system initialization program module IN.

The system status recovery program module REC is controlled via a data table that can be configurated by means of operations-oriented status messages and in which is contained the information about system status recovery measures to be initiated for individual malfunctions.

The commissioning program module PRES provides for commissioning and de-commissioning lines and assemblies of the communications system, whereby the commissioning program module PRES can be called from operations-oriented executions.

At least a major part of the program modules in all three task structures DH, LDU PD, LDU VD has access to a data base DB of the communications system via defined data base access routines DBAR. The access of the individual program modules during the execution of operations-oriented events occurs in a transport level of a multi-tasking operating system of a central communication computer that is realized by a multi-processor configuration.

Figure 2:
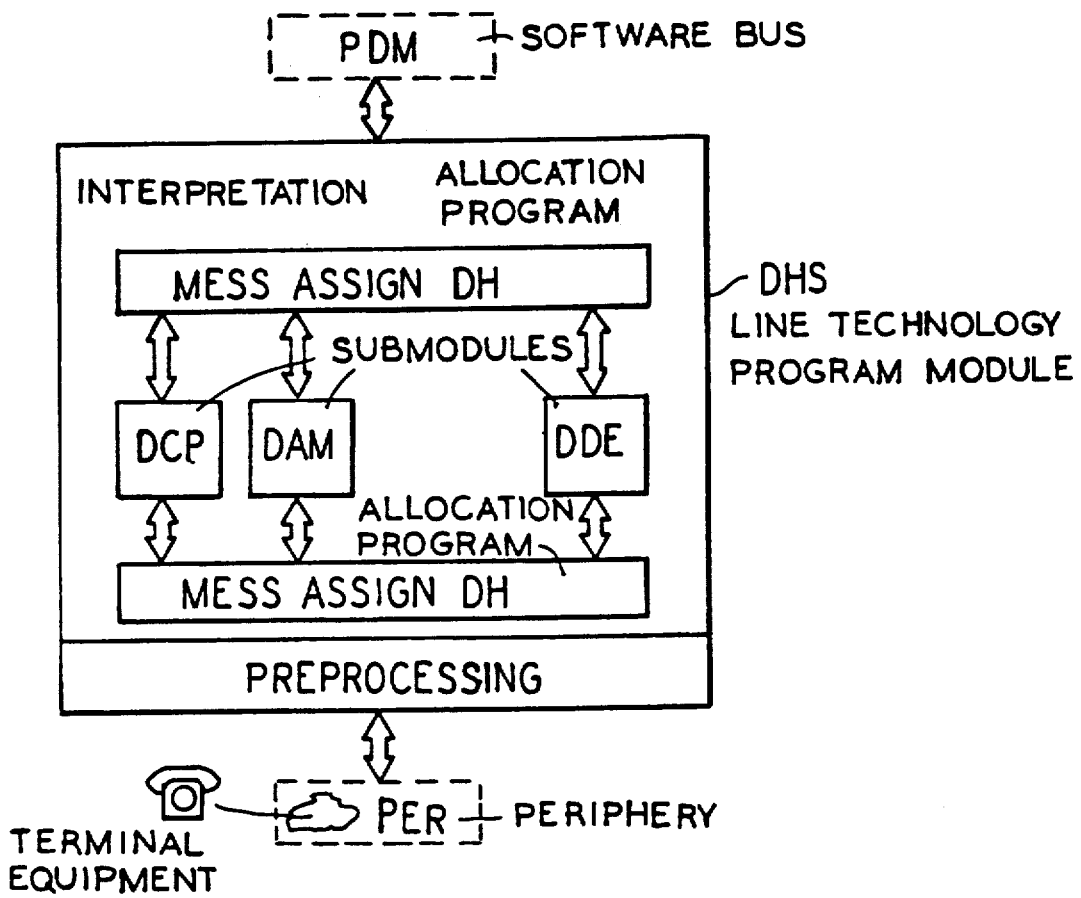
FIG. 2 is a diagram of a structure of an apparatus program module of the line technology task structure level.

FIG. 2 shows the fundamental organization and control structure of a line technology program module DHS allocated to a type of telephone terminal equipment. This organization and control structure essentially has an evaluation program level Interpr and a pre-processing program level Prepr. Input signals deriving from the periphery PER are evaluated according to individual line criteria in the pre-processing program level Prepr and are output to the evaluation program level Interpr in a correspondingly edited form. Over and above this, the pre-processing program level Prepr provides for the conversion of logical status messages that are transmitted to the line technology program module DHS via the software bus PDM into setting data for the telephone terminal equipment situated in the periphery PER. The status messages forwarded to the line technology program module DHS can thereby also be additionally evaluated and converted in the evaluation program level Interpr before a processing in the pre-processing program level Prepr. Essentially, however, the evaluation program level Interpr serves for the conversion of the stimuli output from the periphery PER, in part after prior handling in the pre-processing program level Prepr, into logical status messages. The formation of these logical status messages results from system-associated parameters that reside at least in part in the data base of the communications system.

The evaluation program level Interpr has program sub-modules DCP, DAM, DDE that are respectively allocated to defined sub-functions of the overall functions that can be executed by the line technology program DHS. In the present example, the program sub-module DCP is allocated to switching-oriented functions in the control of the signalling procedure and of the user interface of the terminal equipment of the periphery PER, whereas the program sub-module DAM is allocated to the operations-oriented information and data flow and the sub-module DDE is allocated to the security-oriented information and data flow of the type of terminal equipment to which the line technology apparatus program module DHS is allocated.

The allocation of the signals or status messages from the software bus PDM or of the signals from the periphery PER to the individual program sub-modules DCP, DAM, DDE occurs by means of a correspondingly designed allocation program Mess Assign DH (message assignment) in the evaluation program level Interpr.

Figure 3:
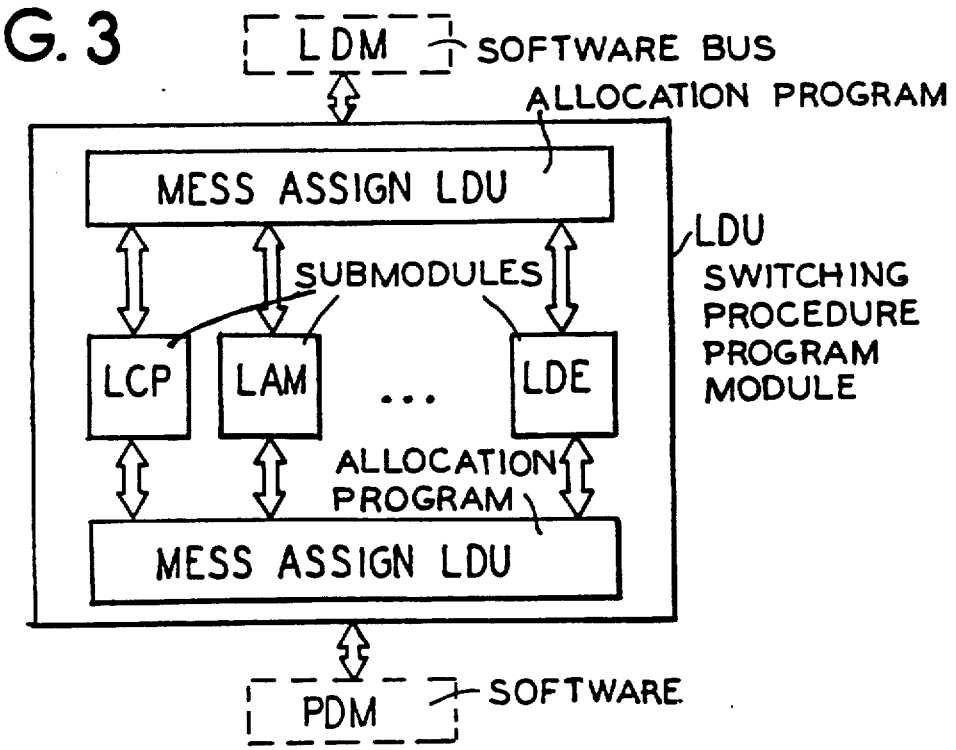
FIG. 3 is a diagram of a structure of a program module of the operating technology and switching technology coordination task structure level.

The fundamental organization and control structure of a switching procedure program module LDU shown in FIG. 3 is similar to the structure of a line technology program module shown in FIG. 2 insofar as sub-modules LCP, LAM, LDE and an allocation program Mess Assign LDU are also provided. The switching procedure program sub-modules LCP, LAM, LDE again serve switching-oriented, operations-oriented and security-oriented functions, whereby a branch onto the required switching procedure program sub-module LCP, LAM, LDE is performed by means of the allocation program Mess Assign LDU. Status messages from the operations-oriented and security-oriented application task structure level or from the line technology structure level are accepted via the software bus structure LDM, PDM or are output thereto.

Figure 4:
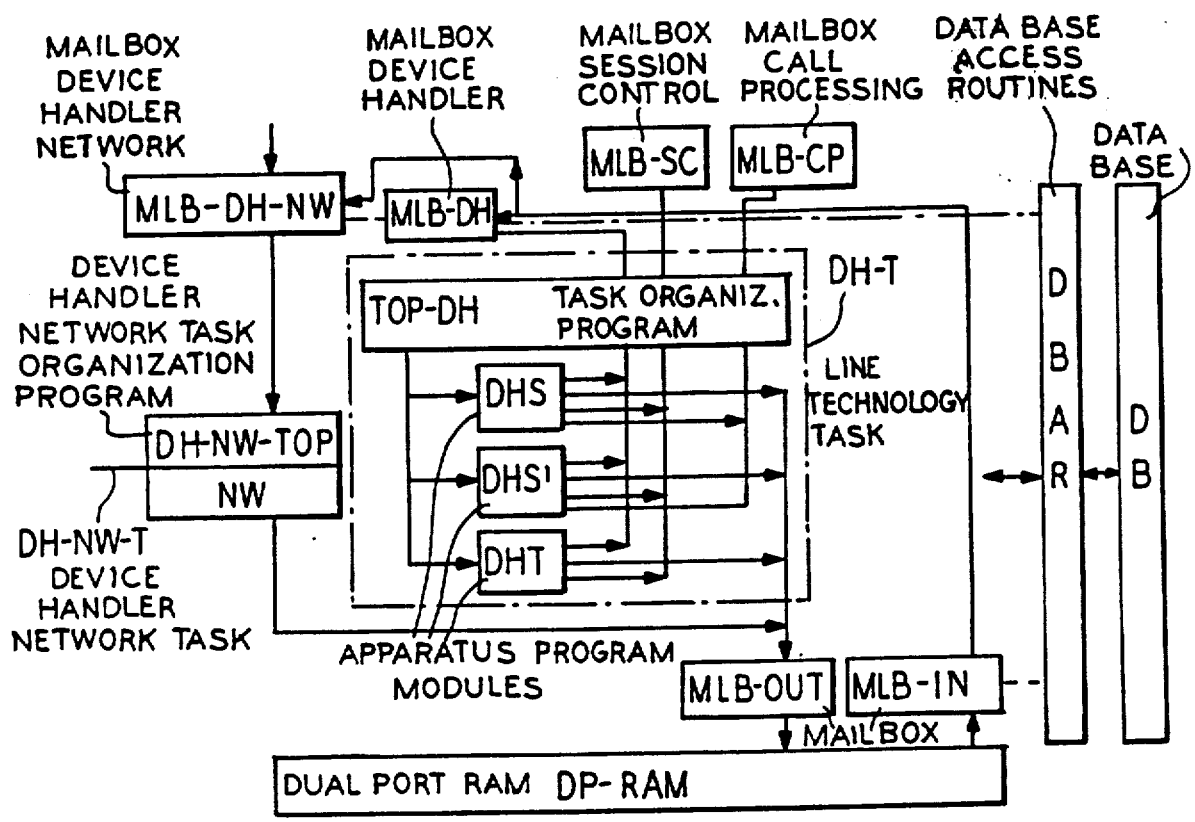
FIG. 4 a diagram of a line technology task contained in FIG. 1 having apparatus program modules for matching to different types of terminal equipment shown in a more detailed illustration within the system environment.

FIG. 4 shows the line technology structure level in its system environment in a more detailed illustration. The line technology structure level is essentially formed by a line technology task DH-T in which apparatus program modules DHS, DHS', DHT are hierarchically subordinated to a line technology task organization program TOP-DH. The apparatus program modules DHS, DHS' thereby serve for the control of the signalling procedure and of the user interface of different types of terminal equipment and have applicable operations-oriented and security-oriented components. The apparatus program module DHT corresponds to the apparatus program module DHT of FIG. 1 and serves the purpose of matching the operations-oriented data and information flow to an operations technology terminal.

The communication of signals to the line technology task DHT or of setting data to the periphery PER occurs via transfer memories M1b-In M1b-Out operated mailbox-like that are considered to be an integral component part of the transport level of the multi-tasking operating system for signal and setting data. The transport level is augmented by an input and output memory M1b-DH operated mailbox-like via which the line technology task DH-T accepts signals from the transfer memory M1b-In and from the operating technology and switching technology coordination structure level (not shown). The status messages generated by the line technology task DH-T and intended for the switching technology coordination structure level are output at an input and output memory M1b-CP that is allocated to a task with the switching procedure program module CP (FIG. 1) and the status messages intended for the operating technology coordination structure level are output at an input and output memory M1b-SC that is allocated to a task with the coordination program module SC (FIG. 1).

The transfer memories M1b-In, M1b-Out operated mailbox-like operate in the direction toward the periphery PER of the commnunciations system with a memory DP-RA of an input/output processor and also represent the input or the output of a switching matrix task DH-NW-T that has a switching matrix network apparatus program module NW that is hierarchically subordinate to a switching matrix network task organization program DH-NW-TOP. Signals or setting data from the periphery PER are output from the transfer memory M1b-In to an input and output memory M1b-DH-NW operated mailbox-like that over and above this also accepts status messages from the operating technology and switching technology coordination task structure level.

The switching matrix network apparatus program module NW as well as the apparatus program modules DHS, DHS', DHT have access to the data base DB of the communications system via the data base access routines DBAR.

Figure 5:
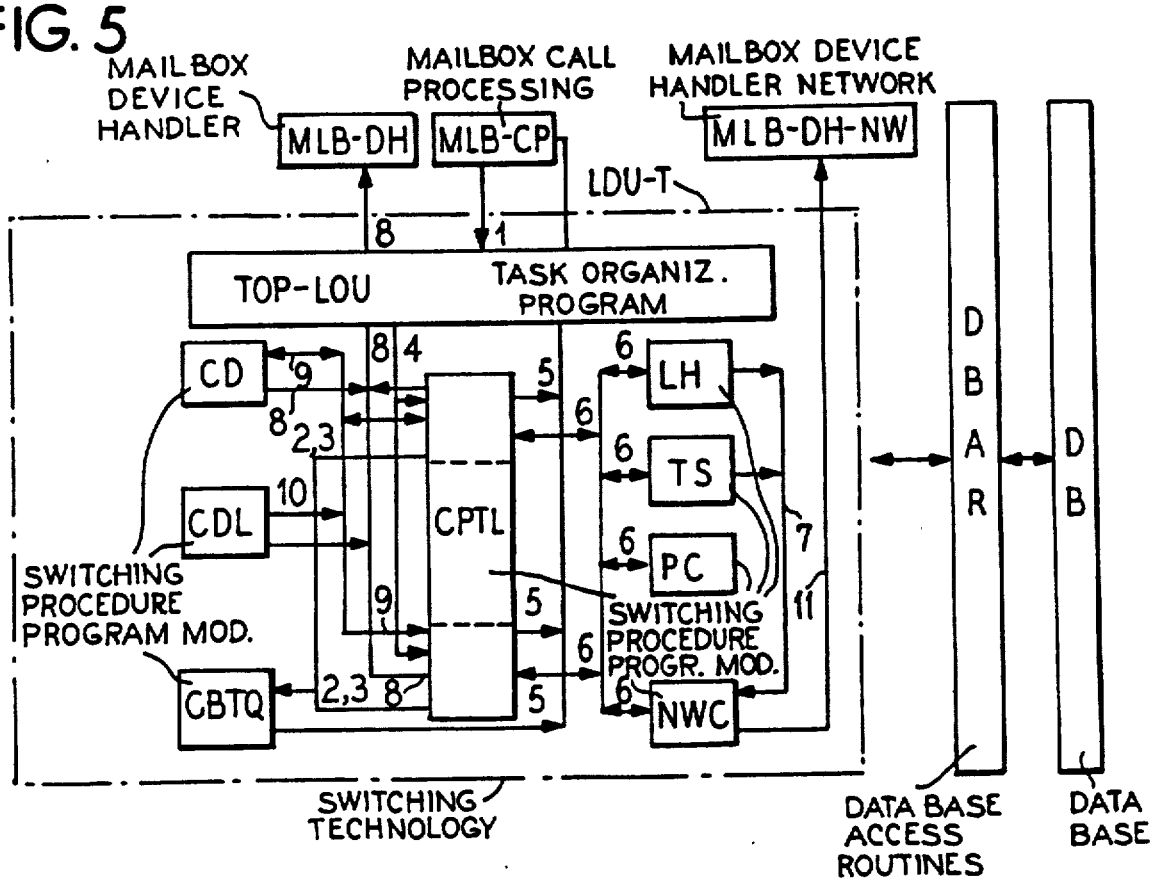
FIG. 5 is a diagram of a organization structure of a switching procedure program module embedded into the system environment.

The switching technology structure shown in FIG. 5 exhibits fundamental similarity to the line technology structure level shown in FIG. 4. A switching technology task LDU-T has a switching technology task organization program TOP-LDU to which a plurality of switching procedure program modules are hierarchically subordinated. The connection of the switching technology task LDU-T to the system environment with respect to the data base DB again occurs via the data base access routines DBAR and, with respect to the line technology structure level, occurs by means of the input and output memories M1b-DH or M1b-DH-NW in an outgoing direction and, in an incoming direction, via the input and output memory M1b-CP directly allocated to the switching technology task LDU-T.

The switching procedure program modules are structured such that a connection control program module CPTL (call processing trunk line) in which two sub-modules for trunk and line control are indicated by broken-line subdivision, and seven further performance features program modules for the activation and de-activation of corresponding control procedures typical of the performance features are formed. The function of the performance feature program modules shall be set forth below:

Performance Feature Program Module CD (Call Distribution)

This program module is called in by the connection control program module CPTL when a subscriber has selected a basic number identifying a manual sWitching position, when a call is rerouted to the manual switching position, or when a terminal equipment is called for which an order to reroute incoming calls to a manual switching position is entered in the data base. The position to be called is respectively identified by the current status of the system. For changes in the status of the system for example for transition from standard traffic to night time switching, the signalling at the called position is automatically adapted the calling position not being affected.

Performance Feature Program Module CDL (Call Dispatching Line)

This performance feature program module CDL is also called in by the connection control program module. This occurs when a call request for a specific subscriber is present but this request must also be signalled at other subscribers, for example for broker serial-sYstem subscribers. The performance feature program module CDL identifies the stations to be called.

Performance Feature Program Module CBTQ (Call Bank and Trunk Queing)

The roll-in and roll-out as well as the execution of call-back requests and call waiting list requests is realized in this performance feature program module CBTQ.

Performance Feature Program Module LH (Line Hunting)

The roll-in or, respectively, roll-out and the execution of calls to one or more PBX line groups is realized with this performance feature program module LH.

Performance Feature Program Module PC (Paging Controller)

This performance feature program module is also called in by the connection control program module CPTL when either a corresponding basic number was dialed or a call was rerouted to the paging system. The performance feature program module PC autonomously administers the paging requests even when the requester has already hung up. When a plurality of requests are pending simultaneously, the paging signalling can be synchronized. Report requests are accepted and the call set up between a paging and a reporting terminal equipment is assisted.

Performance Feature Program Module TS (Trunk Searcher)

When specific indicators are present in the status messages, the program module TS searches an appropriate line set. The performance feature program module TS thereby supplies the data needed for the call traffic for the digit sending such as, for example, pauses to be placed between digits or switching from dial pulsing to multi-frequency code selection.

The performance feature program module NWC (Network Controller) is also included in the performance feature program modules, the entire logical connection memory control and switching matrix network control being realized with this network controller. The performance feature program module NWC reserves predetermined routes and releases them when so instructed. It is thus responsible for the administration of the time slots in the time-division multiplex switching the matrix network. For the actual physical setting of the switching matrix network, the performance feature program module NWC compiles and outputs switch requests for the switching matrix network apparatus program module.

The connection control program module CPTL and at least some of the performance feature program modules CD ... TS have operations-oriented and/or security-oriented program sub-modules that communicate with further tasks or program modules of the operating technology switching technology coordination task structure or of the operations-oriented and security-oriented application task structure via the program bus structure or via further transfer memories (not shown) operated mailbox-like.

The interfaces within the switching technology structure level symbolically indicated by arrows have the following detailed significance:

1: Pending message from the line technology structure level to the switching technology task LDU-T;
2, 3: Sub-program call in for execution of a call-back or delayed call request;
4: Call-in of the connection control program module CPDL with interface supply by the switching technology task organization program TOP-LDU;
5: Message interface for the transfer of messages within the switching technology task LDU-T;
6: Sub-program call-in with acknowledgement to the performance feature program modules NDC, PC, TS, LH as assistance during the call set up;
7: Sub-program call-in to the performance feature program module NWC serving a switching matrix network controller by the performance feature program modules LH, TS for route reservation after searching a free PBX line group subscriber or connecting unit;
8: Message interface for the administration of the setting requests for the line technology structure level;
9: Sub-program call-in with acknowledgement by the connection control program module CPTL for selection of a manual switching position or call rerouting to this for the identification of the private branch exchange to be called;
10: Sub-program call-in with acknowledgement by the connection control program module CPTL when a set up to a subscriber is present and a parallel signalling to other stations is to be executed;
11: Message interface to the destination mailbox M1b-DH-NW of the switching matrix network task.

FIG. 6 shows the fundamental structure of the messages both within the structure levels as well as between the structure levels. The messages are fundamentally divided into three message sections. A system header, defined system-wide, is followed by a specific header that differs for message traffic between two structure levels dependent on the transmission direction. This specific header is followed by the actual data part. All messages are compiled in this basic format in a user memory.

The system header which is valid system-wide for every communication between the structure levels is constructed in the following way: the first position is occupied by an identification number of the task outputting the message, this being supplemented in the adjoining field by an identification number of the sending program module or program sub-module within the sending task. The identification number of the receiving task or of the receiving module within this task is correspondingly indicated in the two following data fields. A logical element is situated in the data field EVENT CODE. The possible, further message elements are deposited in the corresponding memory areas of the data base.

The structure of the specific header following the system header varies depending upon the structure levels in message traffic with one another as well as with the transmission direction of the message between these structure levels. FIG. 6 is based on messages between the line technology structure level and the switching technology structure level. The connection name of a line on which a specific subscriber terminal equipment appears as a transmitter is situated in the first data field. The call number of this transmitting terminal equipment is contained in the following data field. This is followed by a field for a service indicator with which information about the type of requested communication service is forwarded on the link or trunk line, particularly to an ISDN terminal equipment. In the following three data fields, the same connection-relevant parameters for the terminal equipment operating as a receiver are transmitted. Address data for memory areas within the data base in which further data belonging to the message are contained are transmitted in the following data field SRC CRSP (store pointer).

Data from the memory area for volatile data can be contained in the following data part.

A multitude of further message elements that, for example, indicate what signalling message is involved, what B-channel of an ISDN connection is provided or which performance features are to be transmitted that are also present in the public network in network-overlapping fashion occur in the specific header. Further message elements provide for the transmission of indicator information prepared in the switching technology structure level to the terminal equipment or for the transmission of message fee units. A multitude of appropriately, logically defined message elements can be used to define different message types for the messages between the individual structure levels of the communications system, a few significant message types thereof being described below:

Alerting: This message type is used for messages from the switching technology structure level to the line technology structure level and has the significance that the connection can be set up to the destination; the message contains the statement that the call is to be signalled at the call destination.

Cancel: This type of message is used in both directions between the line technology structure level and the switching technology structure level in order to request the de-activation of performance features.

Cancel Acknowledge: This message occurs as an acknowledgement in response to the message "cancel" and confirms the de-activation of the corresponding performance feature.

Cancel Reject: The request for de-activation of a performance features is rejected with this message.

Connect: This type of message is again used between the line technology structure level and the switching technology structure level. In the direction toward the switching technology structure level, this message communicates the call acceptance, whereas the calling side is informed in the opposite direction that the connection is through-connected to the destination.

Disconnect: The message is used proceeding from the switching technology structure level to the line technology structure level in order to communicate that the connection can not be set up to the destination: for example, because the called subscriber is busy. In this phase, performance features, for example request of a connection position, can still be requested.

Facility: Proceeding from the line technology structure level to the switching technology structure level, this message initiates a call-dependent performance feature, for example, offering call waiting, proceeding from a process. In the reverse direction, a call-dependent performance feature, for example direct address, is initiated with this message proceeding from a process. The "facility" message can thereby be used as a logical category term for a plurality of messages, whereby the actual performance feature that is to be initiated is transmitted in a message element of this message.

Facility Acknowledge: This message is used between the switching technology structure level and the line technology structure level as positive acknowledgement for a performance feature request.

Facility Reject: The activation of a requested performance feature is rejected in both directions with this message.

Information: Auxiliary information, for example for signalling a call to a plurality of stations, can be communicated between the switching technology structure level and the line technology structure level with this message. Digits can also be transmitted with this message in the direction toward the switching technology structure level.

Register: This message is used in both directions between the switching technology structure level and the line technology structure level in order to request the activation of a performance feature that is not call-related. The message thereby represents a categorical term for a plurality of messages that are individualized by different data in at least one of the message elements in the sense of distinguishing between different performance features.

Register Acknowledge: This message is used in both directions between the switching technology structure level and the line technology structure level in order to confirm the activation of a performance feature that is not call-related.

Register Reject: The request for activation of a performance feature is rejected with this message in both directions.

Release: Directed from the line technology structure level to the switching technology structure level a release event is initiated with this message. In the opposite direction, the line technology structure level is informed that the operating terminal equipment has released. This message can also be used in order to disconnect call routes and tones.

Set Up: A switching-oriented process is started with this message from the line technology structure level to the switching technology structure level. For block selection, the message contains all of the information required for the call set up and contains only a part thereof for single digit dialing. In the opposite direction, this message has different conotational contents; dependent upon what switching-oriented sub-process is present, the message can represent a call report to the called side, the occupation of a set or a parallel signalling. Switch requests for a digital switching matrix network, for example route through connect tones, are also communicated with this message.

Set Up Acknowledge: This message is transmitted in the direction to the switching technology structure level as positive acknowledgement when the line technology structure level has identified proceed-to-select condition or the dial tone was recognized. In the opposite direction this message is transmitted as an acknowledgement in response to a message "set up" in case the requested process was capable of being started.

FIG. 7 shows the chronological course of messages between the switching technology structure level and the line technology structure level. After the handset of a telephone subscriber "A" has been lifted up, a signal to the line technology structure level occurs and is converted by this structure level into a message "set up" to the switching technology structure level LDU. As acknowledgement, the apparatus program module of the calling subscriber receives the message "set up acknowledge".

The connection control program module in the switching technology structure level LDU subsequently sends a message "set up" to the switching matrix network task DH-NW in order to connect the dial tone for the calling subscriber. Upon arrival of the first message "information" from the apparatus program module of the calling subscriber at the switching technology structure level LDU (the "information", for example, covers the first digit of a selection digit sequence), the dial tone is disconnected with a message "release" to the switching matrix network task DH-NW.

A plurality of further information follow (for example, further selection digits) that are respectively output to the switching technology structure level LDU.

After communication of all selection digits, the switching technology structure level LDU sends the following messages:

The apparatus program module of the calling subscriber "A" receives a message "alerting" insofar as the called subscriber is free.

A message "set up" to the switching matrix network task DH-NW connects the ringing tone and A message "set up" is sent to the apparatus program module DH of the calling subscriber, whereby a call event for the corresponding terminal equipment can be initiated.

When the called subscriber "B" answers, a message "connect" is generated by the apparatus program module DH of the called subscriber and is output to the switching technology structure level LDU. This message "connect" is then forwarded to the apparatus program module DH allocated to the calling subscriber. Subsequently, a message "release" is generated in the switching technology structure level LDU and is output to the switching matrix network task DH-NW, whereby the ringing tone at the calling subscriber is in turn disconnected.

As a last necessary message for the interconnection of the two subscribers, the switching technology structure level LDU forwards a corresponding message "set up" to the switching matrix network task DH-NW.

The release of a connection between two subscribers is shown in FIG. 8.

It is assumed that the calling subscriber "B" wishes to end a call by hanging up his handset. As a result the apparatus program module DH allocated to this subscriber outputs a message "release" to the switching technology structure level LDU that forwards this message to the apparatus program module DH allocated to the other subscriber "A". Over and above this, the switching technology structure level LDU sends a message "release" to the switching matrix network task DH-NW in order to release the connection at the B-side and sends a message "set up" to the switching matrix network task DH-NW in order to connect the busy signal at the subscriber "A".

When the subscriber "A" subsequently hangs up his handset, the apparatus program module DH allocated to this subscriber apparatus generates a message "release" that is output to the switching technology structure level LDU. This leads to the generation of a message "release" in the switching technology structure level LDU that is output to the switching matrix network task DH-NW in order to disconnect the busy signal there and release the connection at the A-side as well.

Figure 9:
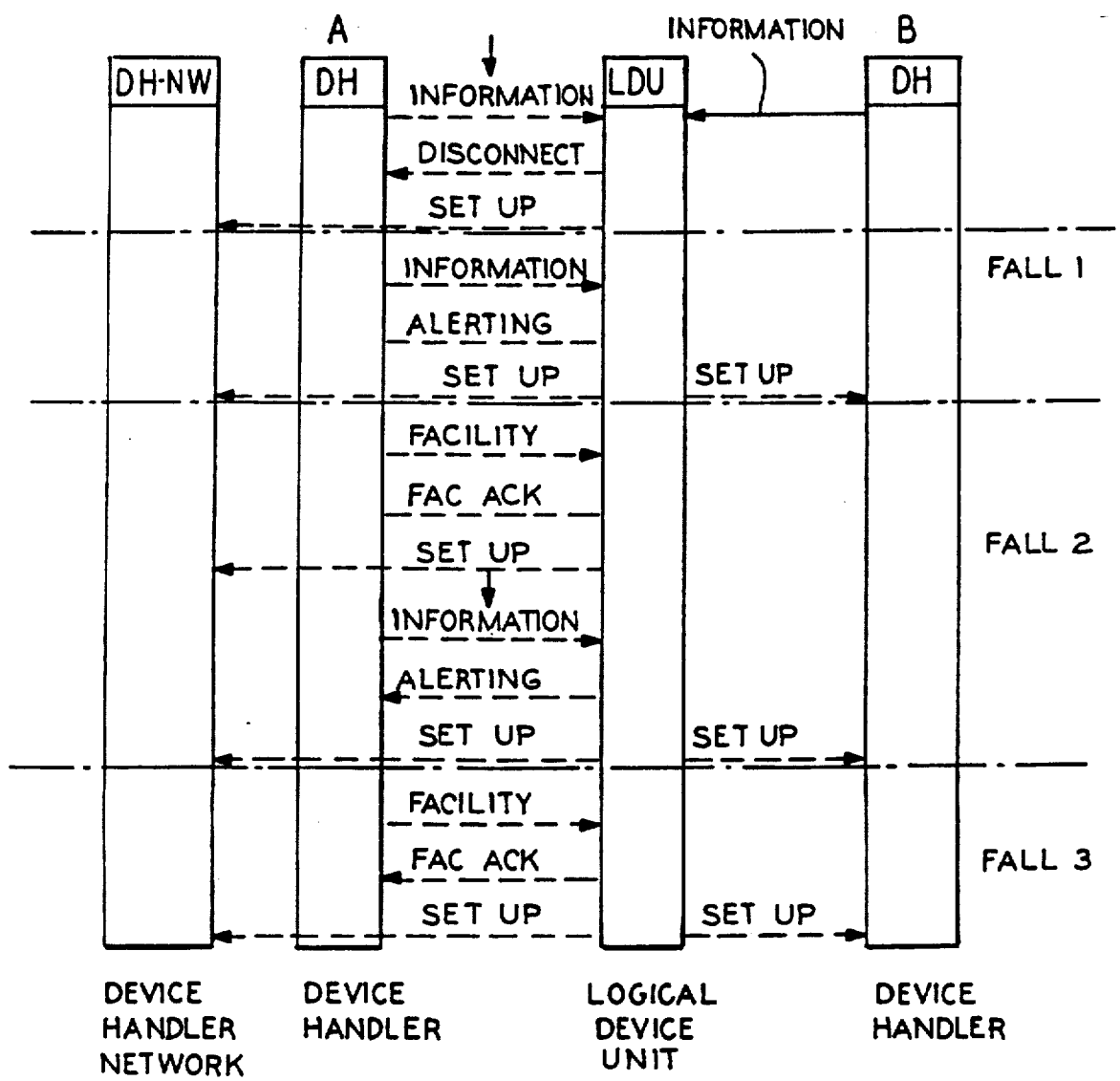
FIG. 9 is a diagram of a task-overlapping status messages during activation of a performance feature.

FIG. 9 shows the message traffic between the different structure levels of the communications system in the call set up to a busy subscriber and subsequent activation of a performance feature. With the transfer of the last selection digit with the message "information" from the apparatus program module of the A-subscriber to the switching technology structure level LDU, when the B-subscriber is busy the apparatus program module DH allocated thereto uses a message "information" to inform the switching technology structure level LDU. The latter generates a message "disconnect" in which a reason is contained in a defined message element.

The switching matrix network task DH-NW then receives a message "set up" from the switching technology structure level LDU that leads to the connection of the busy signal for the A-subscriber.

Proceeding from this switching-oriented condition, the A-subscriber has the possibility of initiating a call-dependent performance feature, for example to initiate an offering onto the existing connection of the B-subscriber. The initiation of this offering can be carried out either by a re-dialing (Case 1), by a signal key (Case 2) or by actuation of a function key (Case 3).

For re-dialing (Case 1) the additional selection digits are output to the switching technology structure level LDU by the message "information" and, for acceptance of this performance feature, a message "alerting" occurs that states that the connection can be set up up the called side and that the call is signalled at the call destination. A message "set up" to the apparatus program module DH of the B-subscriber initiates a signalling of the offering and a message "set up" to the switching matrix network task DH-NW switches the connection between A-subscriber and B-subscriber in the switching matrix network.

When the performance feature "offering" is initiated by actuation of the signal key and additional selection (Case 2), then the apparatus program module of the A-subscriber first outputs the message "facility" to the switching technology structure level LDU and this is acknowledged by the latter with the message "facility acknowledge". Additionally, a message "set up" is output to the switching matrix network task DH-NW in order to connect a positive acknowledgement tone. From the selection of the additional digits (Message "information") up to the through-connection of the switching matrix network at the A-subscriber side and B-subscriber side, the exchange of messages occurs in the same way as described in Case 1.

When the performance feature is initiated with a corresponding function key at the A-subscriber, the exchange of the messages "facility" or "facility acknowledge" again initially occurs between the apparatus program module DH allocated to the A-subscriber and the switching technology structure level LDU. With a message "set up" to the apparatus program module of the B-subscriber, a signalling of the offering then subsequently occurs and the through-connection of the connection occurs with a message "set up" to the switching matrix network task DH-NW.

Figure 10:
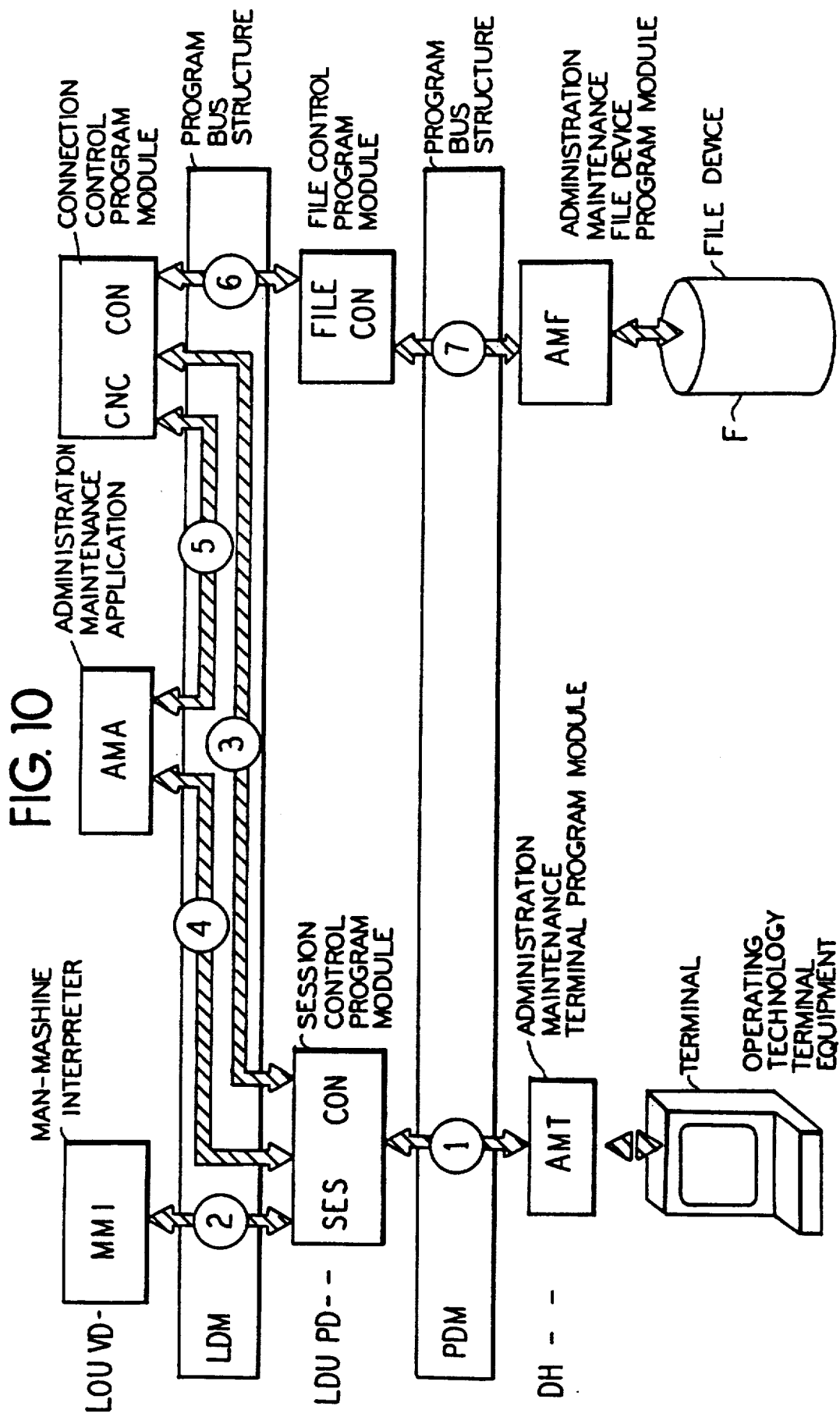
FIG. 10 is a diagram of an information and data flow within the operations-oriented organization and control structure during the implementation of an operations-oriented job.
Figure 11B:
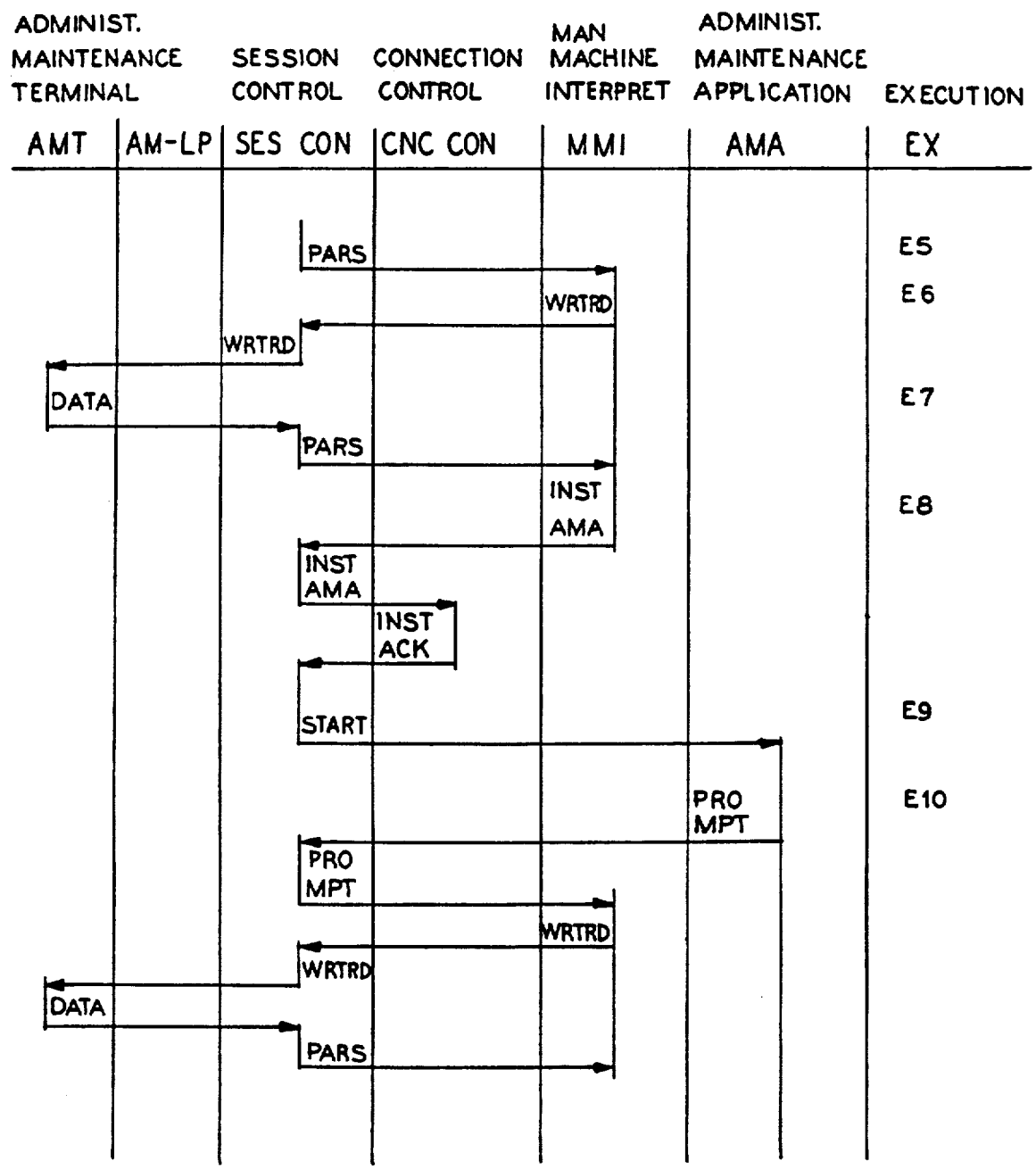
Figure 11C:
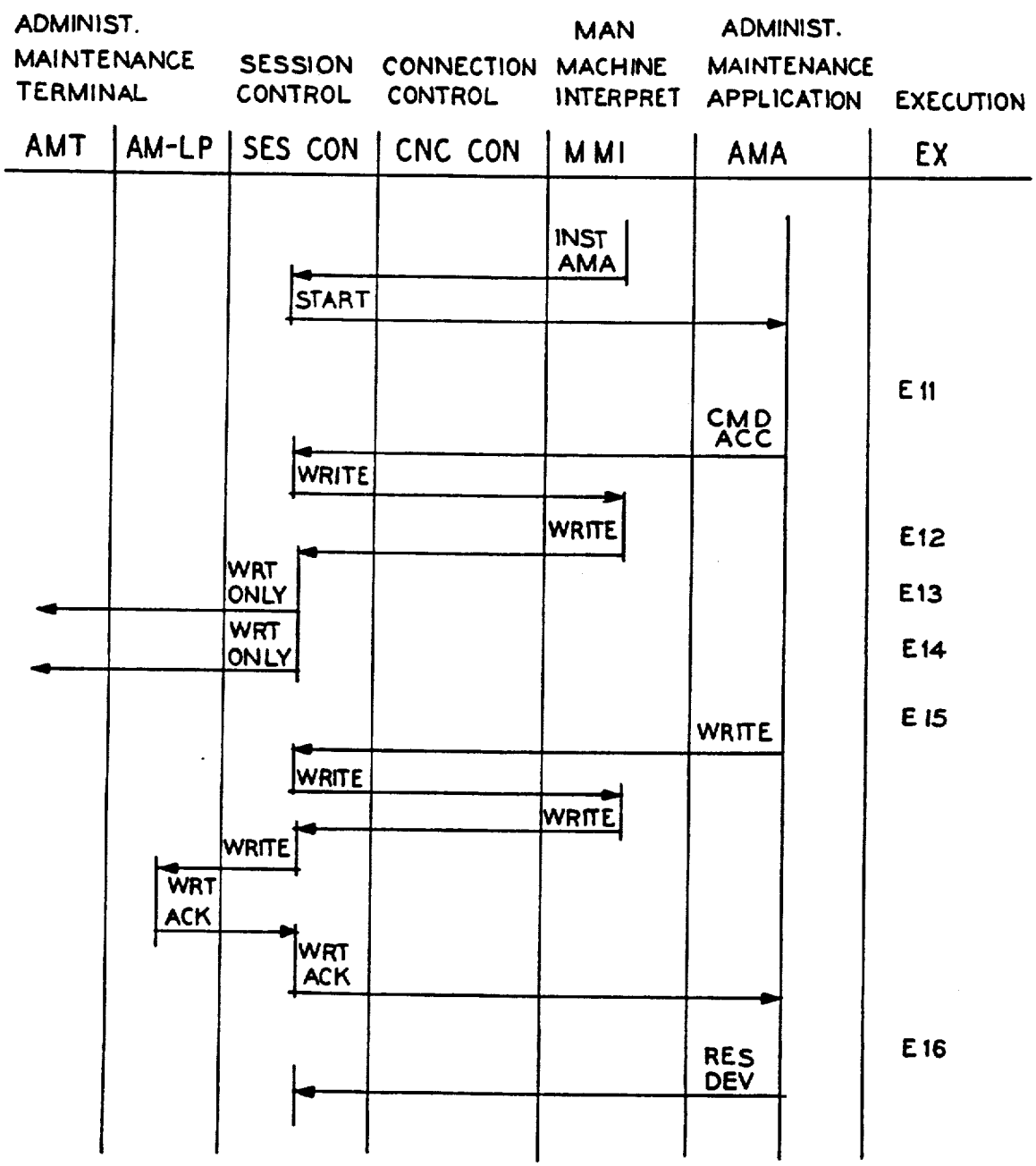
Figure 11D:
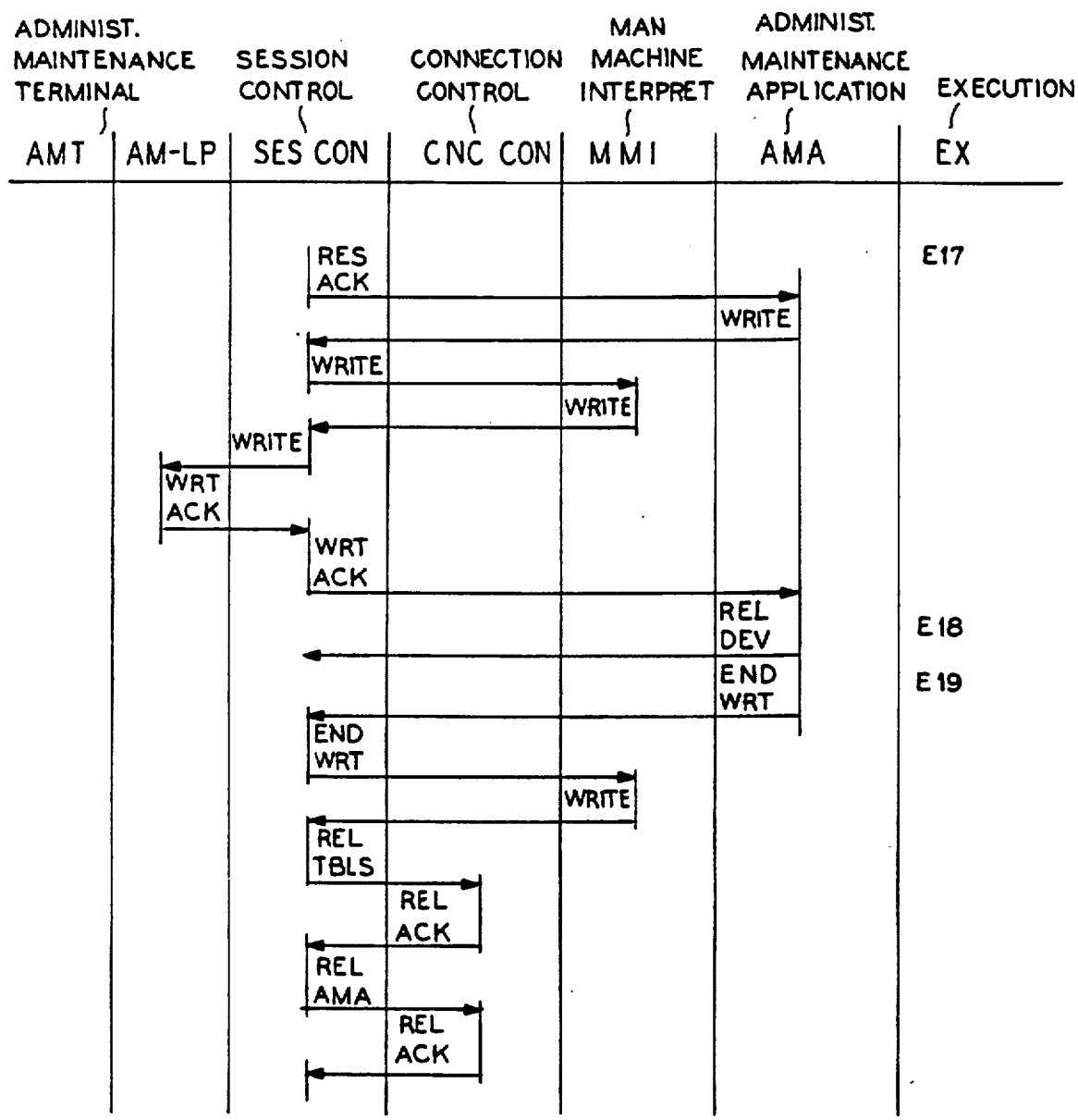
Figure 11E:
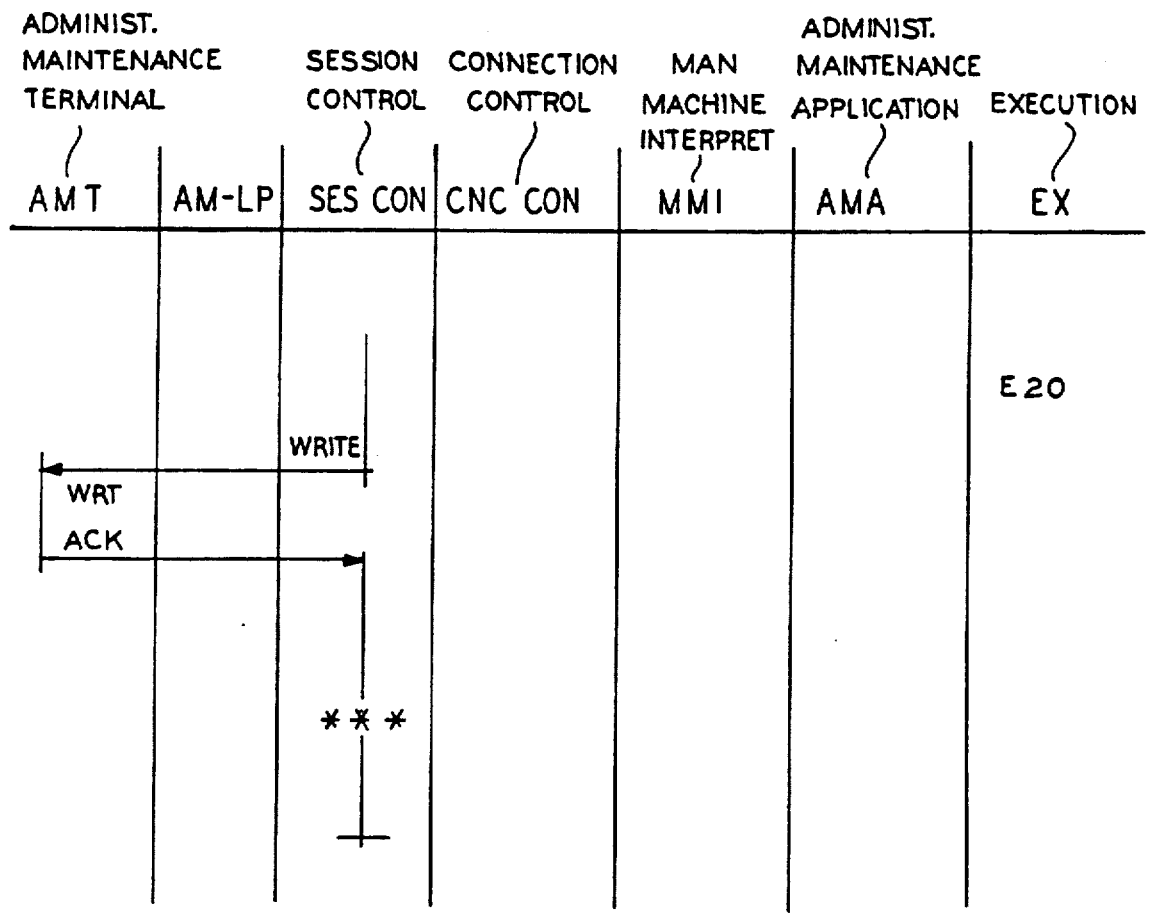

The execution of an operations-oriented function to be viewed as a control case via an operations technology terminal T connected to the communications system shall be set forth with reference to FIG. 10 in which the essential structural component parts of the communications system of FIG. 1 are shown again.

The inputs at the terminal T are collected in the operations technology apparatus program module AMT in the line technology task structure level DH and, after receipt of a transmit criterion via the program bus PDM of the program bus structure PDM, LDM, are forwarded to the coordination program module SES CON in the operations-oriented coordination task structure level LDU PD. This transmission of status messages occurs via the interface "1" in the virtual terminal protocol.

The data are then transmitted from the operations-oriented coordination program module SES CON to the text processor program module MMI via the program bus LDM of the program bus structure PDM, LDM, interface "2". The text processor program module MMI calculates the desired application from the transmitted data and outputs appropriate information to the coordination program module SES CON via the interface "2". The coordination program module SES CON forwards information about the desired application program modules AMA via the interface "3" to the application connection program module CNC CON that subsequently makes the application-associated data file tables required for further instruction processing available via the interface "3".

The text processor program module MMI, to which the instructions generated with the use of the application-associated tables are supplied via the interface "2", continues the check operations with these instructions and forwards the data converted from the instruction to the coordination program module SES CON. The coordination program module SES CON communicates a connection request concerning specific application program modules AMA via the interface "3". Via the interface "5" to the application program modules AMA, the application connection program module CNC CON establishes a connection of the desired application program module AMA to the coordination program module SES CON; the coordination program module SES CON forwards the job request data to the application program module AMA in the virtual application protocol via the interface "4".

After program-associated execution of the job request, the application program module AMA reports the corresponding procedure result to the coordination program module CS CON in the virtual application protocol, again via the interface "4", this coordination program module CS CON in turn forwarding these data via the interface "2" to the text processor program module MMI for conversion of the data from the virtual application protocol into the virtual terminal protocol. The conversion result communicated via the interface "2" to the coordination program module SES CON is transmitted from the latter via the interface "1" to the operations technology apparatus program module AMT and is communicated from the latter to the terminal T.

In case certain applications are not resident in the operations-associated application task structure level LDU VD, the application connection program module CNC CON serves the purpose of re-loading appropriate data held at peripheral storage media F via an appropriate apparatus program module AMF in the line technology task structure level DH, via the interface "7" and the data file administration apparatus program module FILE CON or the interface "6" of the software bus LDM.

The message flow via the interfaces "1" through "5" is shown in FIGS. 11a, 11b, 11c, 11d, 11e. The types of messages communicated via the interfaces "1" through "5" shall be described below in terms of their significance; the chronological sequence of these different types of status messages may be derived from FIGS. 11a, 11b, 11c, 11d, 11e.

1. Interface "2" Between the Coordination Program Module SES CON and the Text Processor Program Module MMI.

The data are transmitted in the data protocol MMIP (Man-Machine-Interpreting Protocol). This protocol provides three successive data fields—system field, session field, MMI field—for the data to be transmitted. The following activities are sequenced via this interface:

checking operations-oriented inputs and the terminal equipment and, as warranted, requests for input correction;

converting the virtual terminal protocol into the virtual application protocol and vice versa;

initiation of the installation of application program modules and of the loading of data tables;

initialization of the text processor program module; and output of information about the lack of data and program resources in the text processor program module.

1.1 Status Messages from the Coordination Program Module SES CON to the Line Technology Task Structure Level DH.

LOGON ACK—Acknowledgement in response to the message "LOGON" (starting an operations-oriented session). This acknowledgement is forwarded to the appertaining operating technology apparatus program module in common with the communication of the session number.

WRITE—Output of data to the operating technology terminal equipment: acknowledgement is required.

WRT ONLY—Output of data to an operating technology, for example confirmation of the start of a session and transfer of application data head part texts; no acknowledgement is required.

WRT RD—Output of data to the operating technology terminal equipment with subsequent request for further inputs.

1.2 Messages from the Line Technology Task Structure Level DH to the Coordination Program Module SES CON.

DATA—Data transfer of input data.

LOGON—Request to start an operations-oriented session; Acknowledgement (LOGON ACK) is required.

WRT ACK—Acknowledgement in response to the message WRITE; as warranted, requests for subsequent order texts.

2.1 Messages from the Text Processor Program Module MMI to the Coordination Program Module SES CON.

INST AMA—Request for the installation of a defined application program module and subsequent transmission of instructions.

LOAD TBLS—Request to load application-associated and language-associated text tables and application-associated parameter tables.

WRITE—Output of general consideration information to the operations technology terminal.

WRT RD—Output of general consideration information to the terminal with subsequent possibility of new inputs.

2.2 Messages from the Coordination Program Module SES CON to the Text processor Program Module MMI.

END WRT—Editing a procedure result of an application program module into data in the virtual terminal protocol.

PARS—Transmission of input data in the virtual terminal protocol for checking.

PROMPT—Request of a new parameter or correction of a prior parameter based on the particulars of an application program module.

WRT RD—Request for output of input masks.

3.1 Messages from the Application Connection Program Module CNC CON to the Coordination Program Module SES CON.

INST ACK—Acknowledgement in response to the message "INST AMA" (request to load an application code or, respectively, to start a task).

LOAD ACK—Acknowledgement for the message "LOAD TBLS" (tables loaded).

REL ACK—Acknowledgement for the offering of tables or application codes.

3.2 Messages from the Coordination Program Module SES CON to the Application Connection Program Module CNC CON.

INST AMA—Request to load the application code and starting a task.

LOAD TBLS—Request to load text and parameter tables.

REL AMA—Conditioned enable of an application code.

4.1 Messages from the Application Program Module AMA to the Coordination Program Module SES CON.

CND ACC—Output of an acknowledgement for the beginning of the application-oriented processing of an operations-oriented request to the input apparatus.

END WRT—Output of procedure results to the input apparatus.

PROMPT—Request for a new parameter or for a parameter correction based on particulars of an application program module.

RES DEV—Reserving an output apparatus for continuous output.

WRITE—Data output to the input apparatus.

4.2 Messages from the Coordination Program Module SES CON to the Application Program Module AMA.

RES ACK—Acknowledgement for the message "RES DEV".

START—Transfer of a converted input instruction.

WRT ACK—Acknowledgement for the messages "WRITE" and "WRT ONLY".

FIGS. 11a, 11b, 11c, 11d, 11e additionally show the message flow from and to an operations-oriented printer to which an operations-oriented apparatus program module AM-LP is allocated.

The illustration of the message flow in FIGS. 11a, 11b, 11c, 11d, 11e is supplemented by comments having the consecutive designations E1, E2 . . . E18. These comments are reproduced below:

E1:
Indication of the designation of the started session.
E2:
Last part of the input request.
E3:
Input to the operations technology terminal equipment.
E4:
Checking the data head part of the input data.
E5:
Command test.
E6:
Requests for input corrections.
E7:
Input to the operations technology terminal equipment.
E8:
Communication that input data are syntax-suited.
E9:
Parameter transfer to an application program module.
E10:
Start of the parameter checking in the application program module.
E11:
Conclusion of the parameter checking.
E12:
Output instruction to the text processor program module.
E13:
Output instruction for the apparatus program module.
E14:
Start of the indication of applications.
E15:
Output messages to the printer.
E16:
Beginning of the continuous printing.
E17:
Acknowledgement about successive reservation.
E18:
Termination of the reservation.
E19:
Indication of the procedure results.
E20:
Report about complete execution of the application-oriented job.

With the output of the message "WRT ACK" in E20, a new installation of the program execution occurs.

In terms of its hardware structure, the communications system shown in FIG. 12 whose components have been set forth above with reference to FIGS. 1 through 5 is fundamentally subdivided into three hierarchical structure levels. The periphery level essentially serving for connection of terminal equipment and lines is formed by three periphery modules PER1, PER2, PER3 each of which is constructed of a plurality of subscriber terminal assemblies or line terminal assemblies such that a maximum of 64 ports, for example, 32 two-wire line connections, are accessible at the peripheral modules PER1 . . . PER3.

For example, the subscriber terminal assemblies can provide connection of analog subscriber terminal equipment. They then usually have one interface means with indication of call and loop closure per terminal equipment to which a respective processor means for analog-to-digital or digital-to-analog conversion and for programmable input impedance or level matching is allocated. One realization of these component parts of a subscriber terminal assembly is disclosed in U.S. Pat. No. 4,381,561. The interface between a maximum of 16 such line-associated equipment and internal communications system PCM connections or HDLC control lines (high level data link control) is formed by an assembly processor control that can, for example, correspond in terms of structure and functioning to the processor disclosed by U.S. Pat. No. 4,694,452. Further details about the function of this processor are disclosed in the product publication of Siemens AG, PBC Peripheral Board Controller PEB 2050 (SM 205), Preliminary Technology Description (Part 1), Ordering No. B/2684-101. The coordination control of the assembly processor control is provided by a microprocessor that can be an integral component part of every subscriber terminal assembly. The job of the coordination control, however, can also be assumed by an input/output processor, for example IOP1, allocated to the respective subscriber terminal assembly.

Other terminal assemblies for, for example, digital or ISDN equipment or links can be provided in each of the periphery modules PER1, PER2, PER3 either alone, additionally, or in combination.

The module processor controls, essentially formed by assembly processor controls, and at least one microprocessor serving for the coordination thereof each administer two PCM-structured connections (PCM highways) PCM2, PCM3; PCM4, PCM5; PCM6, PCM7 and a respective, doubly directed connection for the transfer and acceptance of control information that are transmitted in the standardized data transmission procedure HDLC. A further periphery module PER0 supplies the communications system with call progress tones, announcements and music during the hold status of connections. The additional periphery modules PER0 also contains audible character receivers, transmission and reception devices for selection characters transmitted in multi-frequency code procedure, as well as test transmitters and test receivers. The additional peripheral module PER0, similar to the periphery modules PER1, PER2, PER3, is connected via two PCM highways PCM0, PCM1 as well as via an information transmission link HDLC0.

Figure 14:
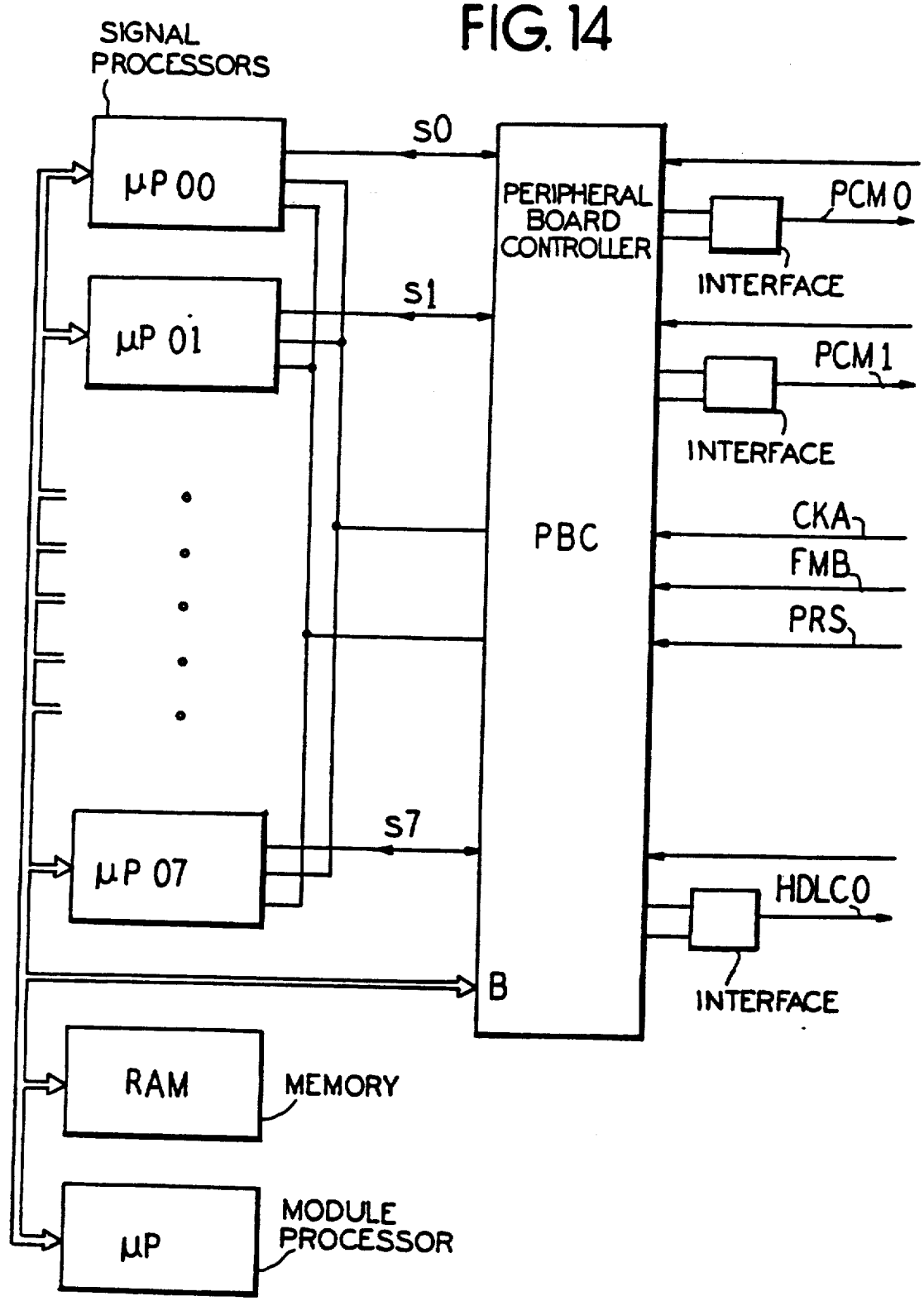
FIG. 14 is a diagram of a schematic illustration of a peripheral module having devices for supplying the communications system with call progress tones and for receiving and transmitting selection characters.

The structure of the additional periphery module PER0 is shown in FIG. 14 and shall be described later.

The next structure level of the digital communications system is formed by a total of four (control information) communications modules HDLC-C0, HDLC-C1, HDLC-C2, HDLC-C3 (HDLC controllers), as well as by two input/output processors IOP1, IOP2, the input/output processor IOP1 being allocated to the two communications modules HDLC-C0 and HDLC-C1 and the input/output processor IOP2 being allocated to the communications modules HDLC-C2, HDLC-C3.

Since the HDLC standard is used for the exchange of data, instructions and messages in many applicable, practically realized systems, corresponding control information communications modules are implemented in the form of integrated circuits. The communications system shown in FIG. 1 uses these modules (HDLC controllers) in the standard way, so that no hardware or software adaptations are needed for the utilization of these modules in the communications system. In the framework of the communications system of the present invention, the block check field in the data transmission blocks defined in the HDLC standard is of particular significance since the block check character string transmitted in this field enables an error-protected forwarding of control information.

A digital switching matrix network module MTS to which all PCM highways PCM0 PCM1 . . . PCM14, PCM15 are connected also belongs in the same structure level as the (control information) communication modules HDLC-C0 . . . HDLC-C3. For example, the digital switching matrix network module is implemented with an integrated circuit PEB 2040 of Siemens AG. Structure and functioning of a digital switching matrix network module are disclosed, for example, by U.S. Pat. No. 3,678,206.

A conference network CON that is connected to the digital switching matrix network module MTS with two further PCM highways PCM8, PCM9 is likewise connected into the structure level of the communication modules HDLC-C0 . . . HDLC-C3 and of the digital switching matrix network module MTS. A possible realization of the conference network CON is disclosed by U.S. Pat. No. 4,054,757.

Just like the two input/output processors IOP1, IOP2, the digital switching matrix network module MTS and the conference network CON are connected to a local multiplex bus LB that represents the interface to the hierarchically highest structure level of the digital communications system. This structure level is formed by a central control processor DP that administers the system data base DB, the program bus structure PDM, LDM and at least most of the program modules, particularly CP and SES CON (see FIG. 1 and the appertaining description), and that coordinates the collaboration of all assemblies and modules of the communications sytem. Significant functions of the central control processor are thus the storage and request-suited running of exchange-oriented programs and, toward the periphery, the control and monitoring of the local bus LB. Additional, standard functions of the central control processor are operations-oriented executions, reliability-oriented displays as well as clock generatings.

Figure 13:
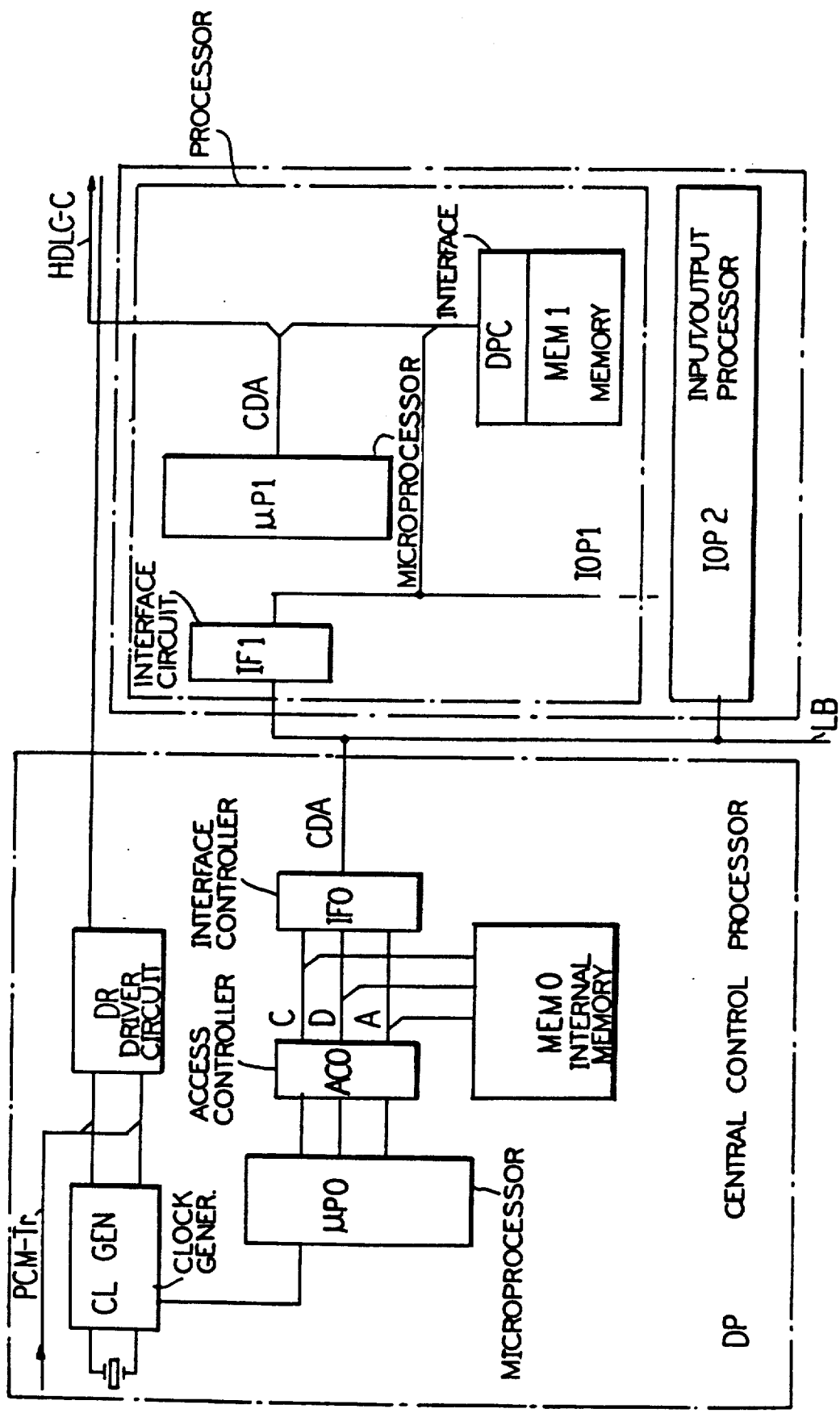
FIG. 13 is a diagram of a schematic illustration of a central control processor and input/output processor respectively provided in the architecture.

It may be seen from the schematic illustration of FIG. 13 that the central control processor DP, shown in FIG. 12, has a microprocessor $\mu$P0 which is preceded by an access controller AC0. Incoming and outgoing control information C, data information D and address information A are present at this access controller AC0. The microprocessor $\mu$P0 has an internal memory MEM0 allocated to it that, for example, has a memory capacity of about 1500K byte.

A clock generator CL-GEN is provided for the synchronization of the overall switching control with the transfer clocks on the PCM lines this clock generator CL-GEN outputing clock pulses to the periphery level of the communications system via an adapted driver circuit DR.

The central control processor DP is connected to the multiplex bus LB, is shown FIG. 12, by an interface controller IFO, this multiplex bus LB, among other things, representing the connection to the input/output processor IOP1, IOP2.

In a fashion similar to that of the central control processor DP, the microprocessor IOP1 and, in the same way, the input/output processor IOP2 is equipped with a microprocessor P1 to which an internal memory MEM1 is allocated. This memory MEM1 is a dual port RAM and consequently has an interface DPC that enables a simultaneous roll-out and roll-in.

Control information C, data information D and address information A are exchanged in the direction toward the periphery with two allocated communication modules HDLC-C (not shown). In the direction toward the central control processor, an interface circuit IF1 interfaces with the multiplex bus LB.

The input/output processor IOP1, IOP2 assist the central control processor DP in handling time-critical jobs. Important functions of the input/output processors IOP1, IOP2 are the polling of the terminal assemblies, the control of the information outgoing to lines or subscribers via the terminal assemblies, outputting numerals and clocking tones and calls.

FIG. 14 shows the essential component parts of the further periphery module PER0 contained in FIG. 12. Based on the illustration of FIG. 12, the two PCM highways that lead to the digital switching matrix network are referenced PCM0 and PCM1. Likewise based on the illustration in FIG. 12, the transmission channel to a (control information) communication module is referenced HDLC0.

Both the PCM highways PCM0, PCM1 as well as the transmission channel HDLC0 represent connections of a processor PBC (peripheral board controller). The processor PBC is preferably realized with the same module as the assembly processors. A further connection level of the processor PBC is in communication with a total of eight signal processors μPO0, μPO1 ... μPO7 to which different functions are assigned. The signal processors μPO0, μPO1 ... μPO7, for example, functions as code receivers and code transmitters for selection characters utilized in the multi-frequency code method, provide for generating call tones and announcements as well as for transmitting and receiving test signals.

The signal processors μPO0, μPO1 ... μPO7 as well as the processor PBC have a memory RAM for programs and data allocated to them. The processor PBC accesses a bus structure via its terminal B, the memory RAM and a module processor μP being connected to this bus structure in addition to the signal processor μPO0, μPO1 ... μPO7.

Further outputs of the processor PBC connected to the communications system serve for the acceptance of the PCM clock (2.048 Mhz) CKA and of a frame synchronization clock of 8KHz-FMB. A peripheral reset signal with which a defined initial status of the further periphery module PER0 can be set is supplied via the terminal PRS.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed:

1. A modularly structured digital communications system for connecting terminal equipment to one another and to public networks comprising:
    at least one operating technology terminal equipment;
    at least one alarm indicting terminal equipment indicating alarm reports acquired from system-security-oriented test procedures; and
    a central system computer having a system data base and at least one multi-tasking operating system, said central computer system further comprising
    means for administration of a line technology task structure having apparatus program modules for interfacing with types of terminal equipment for generating logical messages and operating technology messages from inputs received from at least one of the terminal equipment and operating technology terminal equipment, and for outputting setting data corresponding to the type of terminal equipment and acquired from at least one of logical messages, operating technology messages, and alarm messages, the setting data being provided for at least one of terminal equipment and operating technology terminal equipment and alarm indicating terminal equipment,
    means for administration of operating technology and switching technology coordination task structure having an operations-oriented coordination program module for the control of the operations-oriented information and data flow, having switching procedure program modules that, independent of the type of terminal equipment and independent of communications services, are structure for forming logical sub-processes of the overall switching process such that further performance feature program modules for the activation and de-activation of corresponding control procedures are formed in addition to at least one connection control program module for the control of set up and clear down of connections, and having at least one security-oriented check and evaluation program module for the implementation of non-time-critical, security-oriented check and evaluation events,
    means for the administration of an operations-oriented and security-oriented application task structure having application program modules for the execution of application-oriented functions,
    whereby at least one part of the program modules are respectively individually accessible to the data base via defined data base access routines, and
    means for connecting the line technology task structure to the operating technology and switching technology coordination task structure and to the operations-oriented and security-oriented application task structure, having a program bus structure having at least one transmission protocol which operates independently of the communications service and the type of terminal equipment for the message communicated thereover formed and administered by the at least one multi-tasking operation system;
    the apparatus program modules operatively connected to at least one of the program bus structure, the terminal equipment and the operating technology terminal equipment;

the coordination program module operatively connected to at least the program bus structure;

the application program modules operatively connected to at least the program bus structure.

2. The communications system according to claim 1, wherein the apparatus program modules are combined in at least one line technology task that has an input and output memory operated mailbox-like and administered by a line technology task organization program respectively allocated to the line technology task.

3. The communications system according to claim 2, wherein the line technology task is supplemented by a switching matrix network task having a switching matrix network apparatus program module administered by a switching matrix network task organization program.

4. The communications system according to claim 3, wherein a periphery memory administered by an input/output processor has an input terminal for messages for the terminal equipment acquired in at least one of the line technology task and the switching matrix network task and an output terminal for messages acquired from signals from the terminal equipment which are respectively controllable independently of one another.

5. The communications system according to claim 1, wherein the coordination program module is inserted into a coordination task to which an input and output memory operated mailbox-like an administered by a coordination task organization program is allocated.

6. The communications system according to claim 1, wherein the the switching procedure program module is inserted into at least one switching technology task to which an input and output memory operated mailbox-like and administered by a switching technology task organization program is allocated.

7. The communications system according to claim 1, wherein the security-oriented check and evaluation program modules are inserted into a check and evaluation task to which an input and output memory operated mailbox-like and administered by a check and evaluation task organization program is allocated.

8. The communications system according to claim 1, wherein the program bus structure forms a logical network node for intercommunication of the connection control program modules and at least a part of the performance feature program modules with a part of the apparatus program modules via input and output memories of a switching technology task and via input and output memories of a line technology task.

9. The communications system according to claim 1, wherein a transmission protocol, a virtual terminal protocol, defined independently of the communications service and independently of the type of terminal equipment, is provided for the program bus structure for operations-oriented messages transmitted between the line technology task structure and the operations technology coordination task structure and wherein a further transmission protocol, a virtual application protocol, also defined independently of the communications service and the type of terminal equipment and providing a compact data arrangement having a reduced number of control characters, is provided for the program bus structure for messages transmitted within the application task structure and between the application task structure and the operations technology coordination task structure; and wherein a text processor program module is provided for converting messages in one of the two transmission protocols into messages in the other transmission protocol.

10. The communications system according to claim 9, wherein messages in the virtual terminal protocol and in the virtual application protocol are structured such that a system data head part having a defined sequence of message origin and message destination addresses is followed by a specific data head part associated with operations technology having protocol identification information different for the two protocols, by a designation of a job session to which the respective message belongs and by a destination address indicating the application program module required for running off the job session.

11. The communications system according to claim 10, wherein the text processor program module is inserted into the operations-oriented application task structure.

12. The communications system according to claim 11, wherein a data file administration program module for controlling access to peripheral data files is inserted into the operations-oriented coordination task structure, said data file administration program module being hierarchically subordinated to a data file administration task organization program, and wherein a memory program module for controlling search, read and write requests for memories accepting the data files is inserted into the line technology task structure.

13. The communications system according to claim 12, wherein the coordination program module is structured such that it initiates the selection of the corresponding application program module dependent on the nature of an application addressed within an operations-oriented job.

14. The communications system according to claim 13, wherein an application connection program module hierarchically subordinated to an application connection task organization program is inserted into the operations-oriented application task structure for set up and administration of a connection of the coordination program module to one of the application program modules.

15. The communications system according to claim 14, wherein the application connection program module is structured such that application program modules non-resistent in the application task structure are loadable into the application task structure from peripheral data files upon utilization of the data file administration program module and of the memory program module.

16. The communications system according to claim 1, wherein the connection control program module is directly subordinate to a switching technology task organization program and the performance feature program modules are utilized in connection control in the form of sub-programs of the connection control program module.

17. The communications system according to claim 1, wherein at least one of the apparatus program modules has a further, second sub-module adapted to security-oriented function in addition to having a sub-module adapted to a main function of switching technology and operating technology for a connected type of terminal equipment.

18. The communications system according to claim 17, wherein at least one of the apparatus program modules allocated to the switching-oriented terminal equipment has a third sub-module adapted to operations-oriented functions.

19. The communications system according to claim 17, wherein the apparatus program modules have a pre-processing program level that evaluates signal output by at least one terminal equipment or by the operating technology terminal equipment based on individual line criteria and converts messages from the operating technology coordination and switching technology task structure into setting data for at least one of the terminal equipment, operating technology terminal equipment or alarm indicating terminal equipment, and have an evaluation program level that converts the signal inputs of all types of terminal equipment into protocol-suited messages by means of system-associated parameters; and wherein an allocation program resident in the evaluation program level respectively branches messages and information onto the sub-modules dependent on function.

20. The communications system according to claim 1, wherein a system initialization program module is inserted into the operations-oriented and security-oriented task structure, said system initialization program module being allocated to the multi-tasking operating system such that the initialization of a run up task that coordinates the initialization of the program modules of the task structures is caused by the system initialization program module in the multi-tasking operating system.

21. The communications system according to claim 20, wherein the program modules of the task structures are structured such that they control the initialization of data and hardware system components respectively allocated to them.

22. The communications system according to claim 21, wherein the initialization of the system components that are not unambiguously allocated to one of the program modules of the task structures are implementable by means of the system initialization program module.

23. The communications system according to claim 1 wherein a system status recovery program module is controlled via a data table that can be configurated by means of at least one operations-oriented application program modules and in which information about the system status recovery measures to be initiated in individual malfunctions, including the nature and the scope of fault alarm indications, are contained.

24. The communications system according to claim 1, wherein a commissioning program module provided for the commissioning and decommissioning of lines and assemblies of the communications system is inserted into the operations-oriented and security-oriented application task structure, said commissioning program module being called in by means of at least one operations-oriented program module.

25. The communications system according to claim 1, wherein a traffic data acquisition program module for the acquisition of connection information related to subscriber or communication service is inserted into the operations-oriented and security-oriented application task structure, connection information from at least one of the switching procedure program modules inserted into the coordination task structure being forwarded to said traffic data acquisition program module in the form of messages of the message protocol associated to the switching technology based on defined switching procedure sections.

26. A modularly structured digital communications system for connecting terminal equipment to one another and to public networks comprising:
at least one operating technology terminal equipment;
at least one alarm indicating terminal equipment indicating alarm reports acquired from system-security-oriented test procedures; and
a central system computer having a system data base and at least one multi-tasking operating system, said central system computer further comprising
means for administration of a line technology task structure having apparatus program modules for interfacing with types of terminal equipment for generating logical messages and operating technology messages from inputs received from at least one of the terminal equipment and operating technology terminal equipment, and for outputting setting data corresponding to the type of terminal equipment and acquired from at least one of logical messages, operating technology messages, and alarm messages, the setting data being provided for at least one of terminal equipment and operating technology terminal equipment and alarm indicating terminal equipment,
means for administration of an operating technology and switching technology coordination task structure having an operations-oriented coordination program module for the control of the operations-oriented information and data flow, having switching procedure program modules that, independent of the type of terminal equipment and independent of communications services, are structured for forming logical sub-processes of the overall switching process such that further performance feature program modules for the activation and de-activation of corresponding control procedures are formed in addition to at least one connection control program module for the control of set up and clear down of connections, and having at least one security-oriented check and evaluation program module for the implementation of non-time-critical, security-oriented check and evaluation events,
means for the administration of an operations-oriented and security-oriented application task structure having application program modules for the execution of application-oriented functions,
whereby at least one part of the program modules are respectively individually accessible to the data base via defined data base access routines, and
means for connecting the line technology task structure to the operating technology and switching technology coordination task structure and the the operations-oriented and security-oriented application task structure, having a program bus structure having at least one transmission protocol which operates independently of the communications service and the type of terminal equipment for the messages communicated thereover formed and administered by the at least one multi-tasking operating system;
the apparatus program modules operatively connected to at least one of the program bus structure, the terminal equipment and the operating technology terminal equipment;
the coordination program module operatively connected to at least the program bus structure;

the application program modules operatively connected to at least the program bus structure;

a transmission protocol, a virtual terminal protocol, defined independently of the communications service and independently of the type of terminal equipment, provided for the program bus structure for operations-oriented messages transmitted between the line technology task structure and the operation technology coordination task structure, and a further transmission protocol, a virtual application protocol, also defined independently of the communications service and the type of terminal equipment and providing a compact data arrangement having a reduced number of control characters, provided for the program bus structure for messages transmitted within the application task structure and between the application task structure and the operations technology coordination task structure;

a text processor program module provided for converting messages in one of the two transmission protocols into messages in the other transmission protocol; and messages in the virtual terminal protocol and in the virtual application protocol structured such that a system data head part having a defined sequence of message origin and message destination addresses is followed by a specific data head part associated with operations technology having protocol identification information different for the two protocols, by a designation of a job session to which the respective message belongs and by a destination address indicating the application program module required for running off the job session.

27. The communications system according to claim 26, wherein the text processor program module is inserted into the operations-oriented application task structure.

28. The communications system according to claim 27, wherein a data file administration program module for controlling access to peripheral data files is inserted into the operations-oriented coordination task structure, said data file administration program module being hierarchically subordinated to a data file administration task organization program, and wherein a memory program module for controlling search, read and write requests for memories accepting the data files is inserted into the line technology task structure.

29. A modularly structured digital communications system for connecting terminal equipment to one another and to public networks comprising:

at least one operating technology terminal equipment;

at least one alarm indicating terminal equipment indicating alarm reports acquired from system-security-oriented test procedures; and a central system computer having a system data base and at least one multi-tasking operating system, said central system computer further comprising means for administration of a line technology task structure having apparatus program modules for interfacing with types of terminal equipment for generating logical messages and operating technology messages from inputs received from at least one of the terminal equipment and operating technology terminal equipment, and for outputting setting data corresponding to the type of terminal equipment and acquired from at least one of logical messages, operating technology messages, and alarm messages, the setting data being provided for at least one of terminal equipment and operating technology terminal equipment and alarm indicating terminal equipment, means for administration of an operating technology and switching technology coordination task structure having an operations-oriented coordination program module for the control of the operations-oriented information and data flow, having switching procedure program modules that, independent of the type of terminal equipment and independent of communications services, are structured for forming logical sub-processes of the overall switching process such that further performance feature program modules for the activation and de-activation of corresponding control procedures are formed in addition to at least one connection control program module for the control of set up and clear down of connections, and having at least one security-oriented check and evaluation program module for the implementation of non-time-critical, security-oriented check and evaluation events, means for the administration of an operations-oriented and security-oriented application task structure having application program modules for the execution of application-oriented functions, whereby at least one part of the program modules are respectively individually accessible to the data base via defined data base access routines, and means for connecting the line technology task structure to the operating technology and switching technology coordination task structure and to the operations-oriented and security-oriented application task structure, having a program bus structure having at lest one transmission protocol which operates independently of the communications service and the type of terminal equipment for the messages communicated thereover formed and administered by the at least one multi-tasking operating system;

the apparatus program modules operatively connected to at least one of the program bus structure, the terminal equipment and the operating technology terminal equipment;

the coordination program module operatively connected to at least the program bus structure;

the application program module operatively connected to at least the program bus structure;

at least a part of the apparatus program modules for a further, second sub-module having security-oriented functions in addition to having a sub-module adapted to a main function of switching technology and operating technology for a connected type of terminal equipment;

the apparatus program modules having a pre-processing program level that evaluates signals output by at least one of the terminal equipment or by the operating technology terminal equipment based on individual line criteria and converting messages from the operating technology coordination and switching technology task structure into setting data for at least one of the terminal equipment, operating technology terminal equipment or alarm indicating terminal equipment, and having an evaluation program level that converts the signal inputs of all types of terminal equipment into protocol-suited messages by means of system-associated parameters, an allocation program resident in the evaluation program level respectively branching messages and information into the sub-modules dependent on function.

* * * * *